(12) United States Patent
Fujii et al.

(10) Patent No.: US 7,200,549 B1
(45) Date of Patent: Apr. 3, 2007

(54) METHOD AND EQUIPMENT FOR ENCRYPTING/DECRYPTING PHYSICAL CHARACTERISTIC INFORMATION, AND IDENTIFICATION SYSTEM UTILIZING THE PHYSICAL CHARACTERISTIC INFORMATION

(75) Inventors: Yusaku Fujii, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1203 days.

(21) Appl. No.: 09/583,882

(22) Filed: May 31, 2000

(30) Foreign Application Priority Data

Jun. 21, 1999 (JP) ................................ 11-174648

(51) Int. Cl.
*H04L 9/00* (2006.01)

(52) U.S. Cl. ...................... 703/161; 713/171; 713/184; 713/185; 713/186

(58) Field of Classification Search ........ 713/164–171, 713/189–194, 161, 200–202, 184–186; 382/115; 340/5.1
See application file for complete search history.

(56) References Cited

U.S. PATENT DOCUMENTS

| | | | | |
|---|---|---|---|---|
| 4,993,068 | A | | 2/1991 | Piosenka et al. ............ 713/186 |
| 5,604,802 | A | * | 2/1997 | Holloway ..................... 705/66 |
| 5,680,460 | A | * | 10/1997 | Tomko et al. ............... 713/186 |
| 5,724,427 | A | * | 3/1998 | Reeds, III .................... 380/259 |
| 5,737,420 | A | | 4/1998 | Tomko et al. ............... 380/285 |
| 5,790,668 | A | | 8/1998 | Tomko ......................... 713/186 |
| 5,799,088 | A | * | 8/1998 | Raike ........................... 380/30 |
| 5,812,764 | A | | 9/1998 | Heinz, Sr. | |
| 5,838,812 | A | * | 11/1998 | Pare et al. ................... 382/115 |
| 6,185,316 | B1 | * | 2/2001 | Buffam ........................ 382/115 |
| 6,219,794 | B1 | * | 4/2001 | Soutar et al. ................ 713/202 |
| 6,268,788 | B1 | * | 7/2001 | Gray ............................ 340/5.2 |
| 6,367,016 | B1 | * | 4/2002 | Lambert et al. ............. 713/185 |
| 6,615,350 | B1 | * | 9/2003 | Schell et al. ................. 713/168 |

FOREIGN PATENT DOCUMENTS

| | | |
|---|---|---|
| GB | 2331825 | 6/1999 |
| WO | 98/29983 | 7/1998 |
| WO | WO 98/29983 | 7/1998 |
| WO | 98/48538 | 10/1998 |
| WO | WO 98/48538 | 10/1998 |

OTHER PUBLICATIONS

European Search Report for a corresponding European Application No. 00304560, dated May 18, 2004.
Search Report for corresponding European Appln. No. 05008651.1 dated Jun. 13, 2005.
European Search Report for European Application No. 05008652.9-2415 dated Jun. 24, 2005.

\* cited by examiner

*Primary Examiner*—Emmanuel Moise
*Assistant Examiner*—Tongoc Tran
(74) *Attorney, Agent, or Firm*—Staas & Halsey LLP

(57) ABSTRACT

A cryptographic method and equipment decrypting a cryptographic key by generating an auxiliary code based on a randomly determined numeric key and including a result of encryption into a cryptogram. Upon decryption, the cryptographic key is restored using the numeric key restored according to the entire cryptogram. A cryptographic method and equipment scrambles and encrypts physical characteristic information, and descrambles a result of a decryption, thereby enabling any alteration to a cryptogram to be detected because even a minor alteration thereto changes the result of the decryption. A remote identification system encrypts physical characteristic information using a password as a cryptographic key, and fluctuation of the physical characteristic information, authenticating information represented as a different bit pattern at each identifying processing is generated and sent to a transmission medium.

6 Claims, 19 Drawing Sheets

Fig. 4
(a) CRYPTOGRAPHIC EQUIPMENT
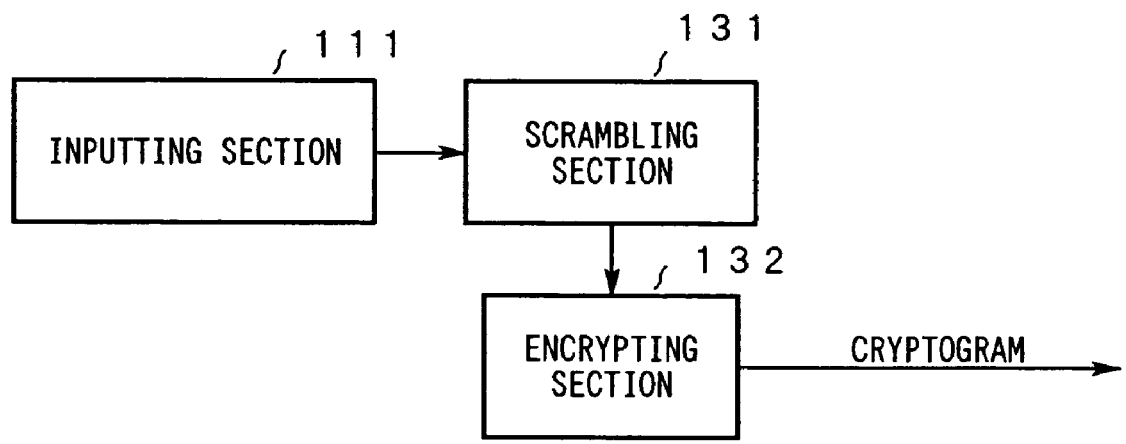
(b) DECRYPTING EQUIPMENT
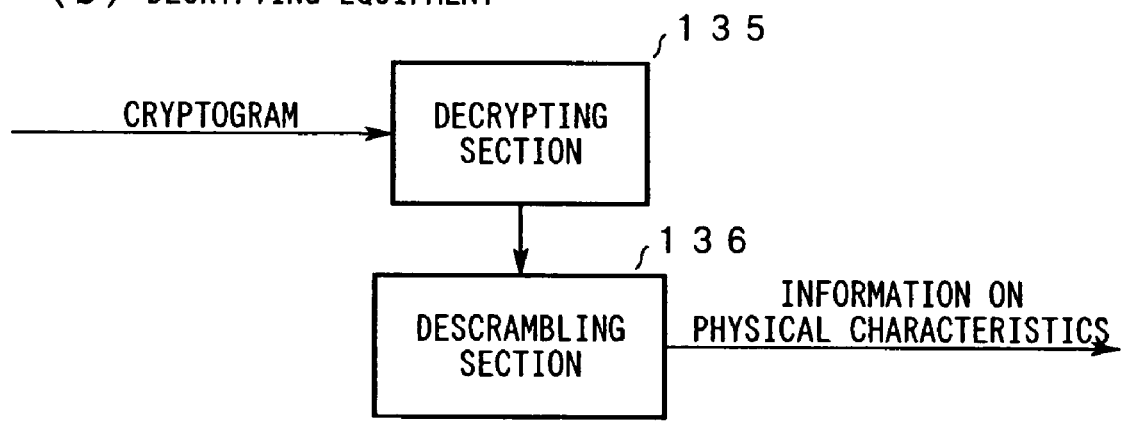

Fig. 8
(a)
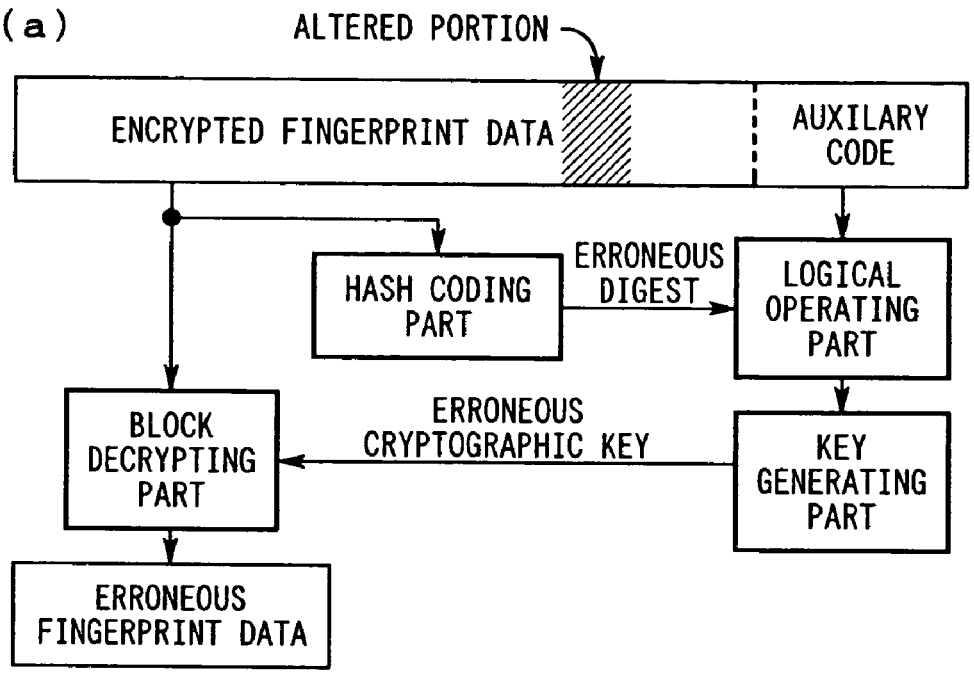
(b)
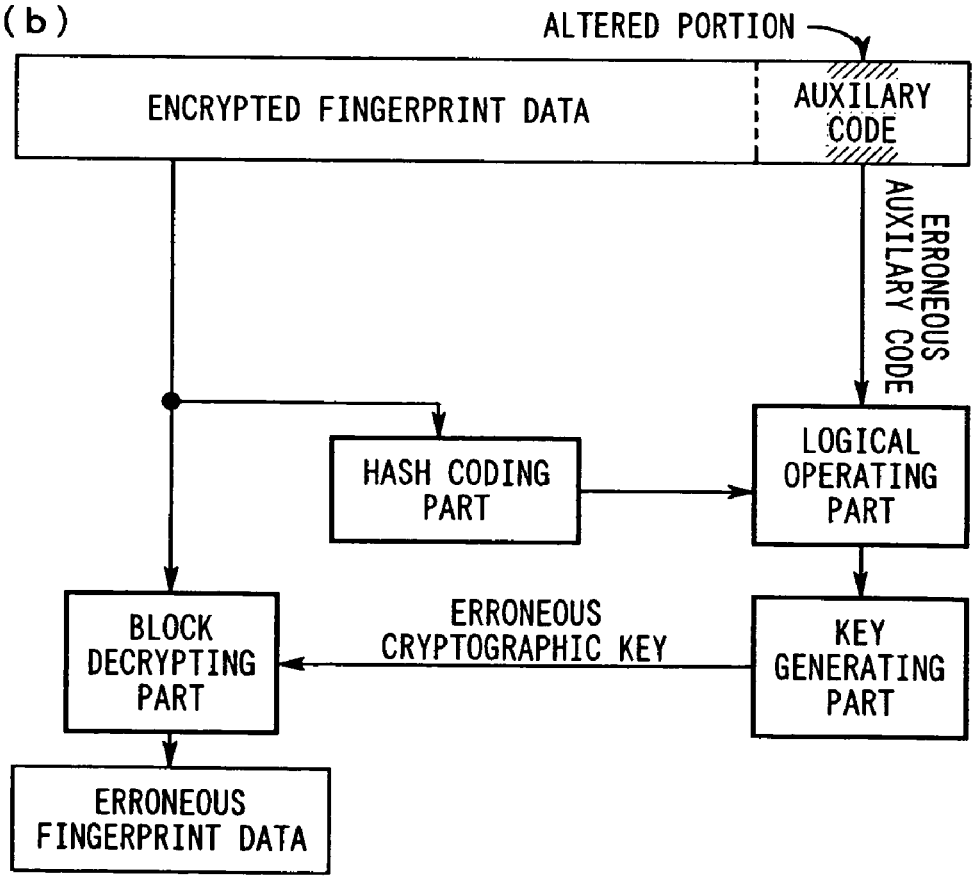

Fig. 11
(a) WITHOUT SCRAMBLING
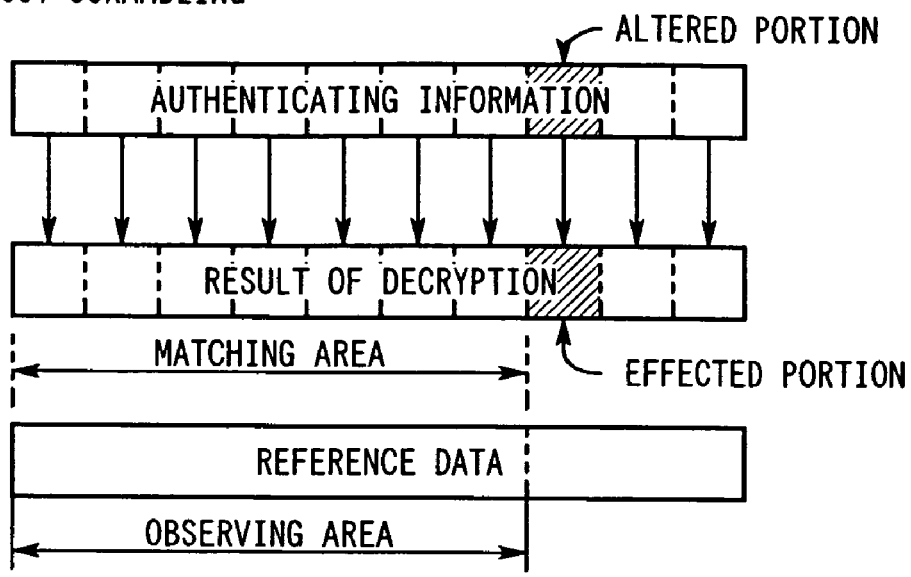
(b) WITH SCRAMBLING
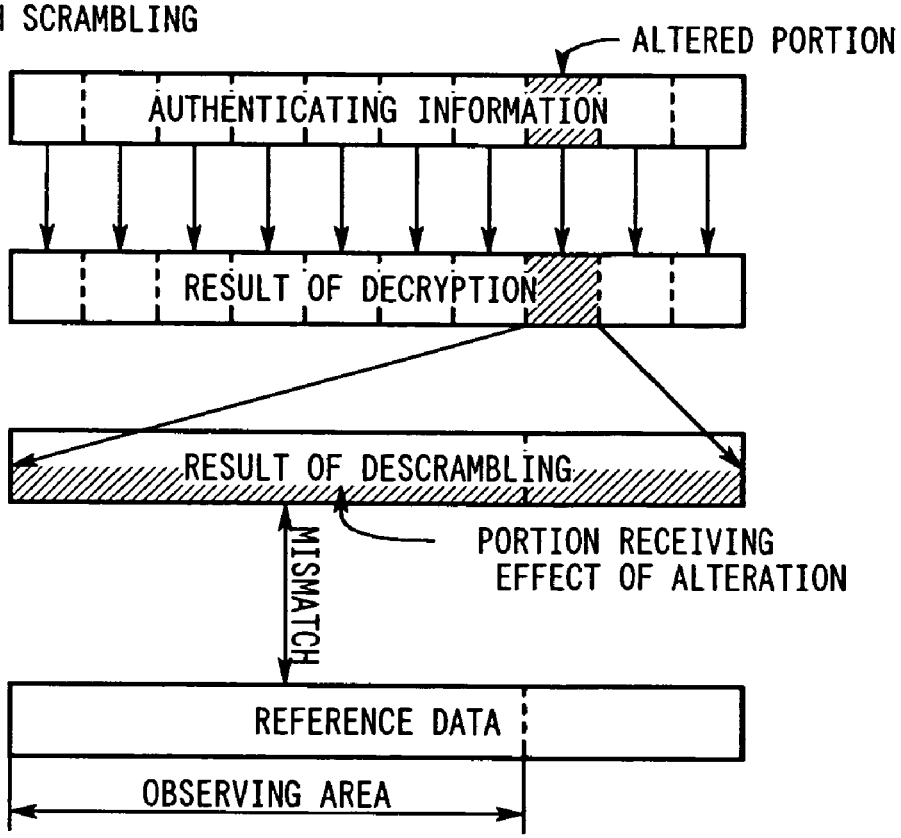

Fig. 14
(a)
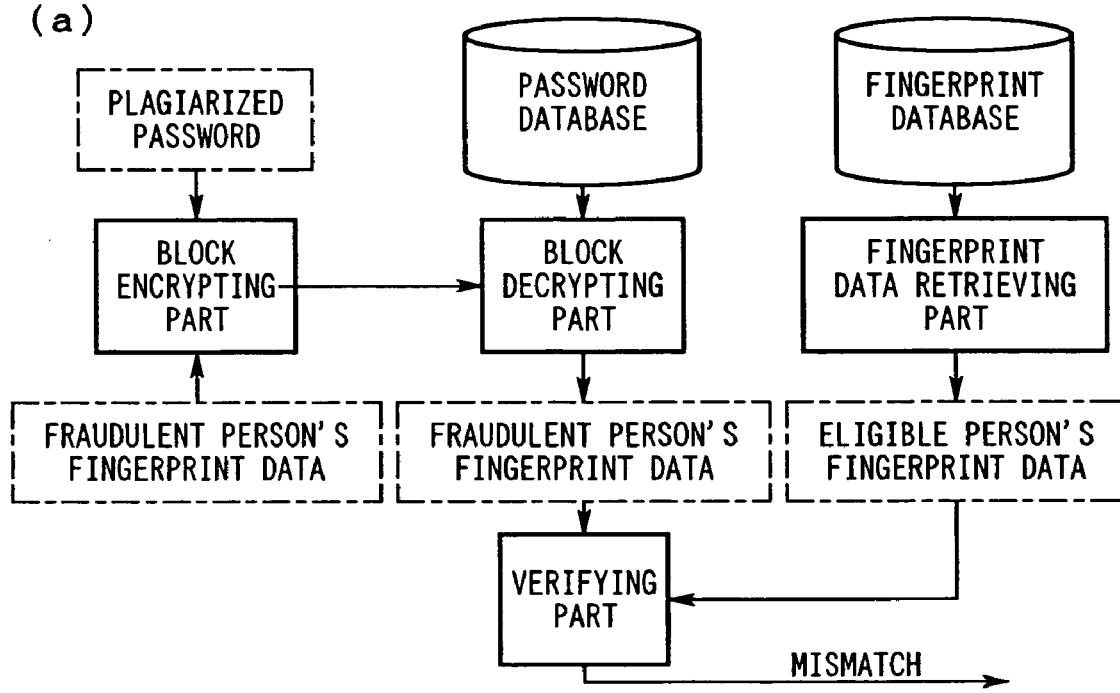
(b)
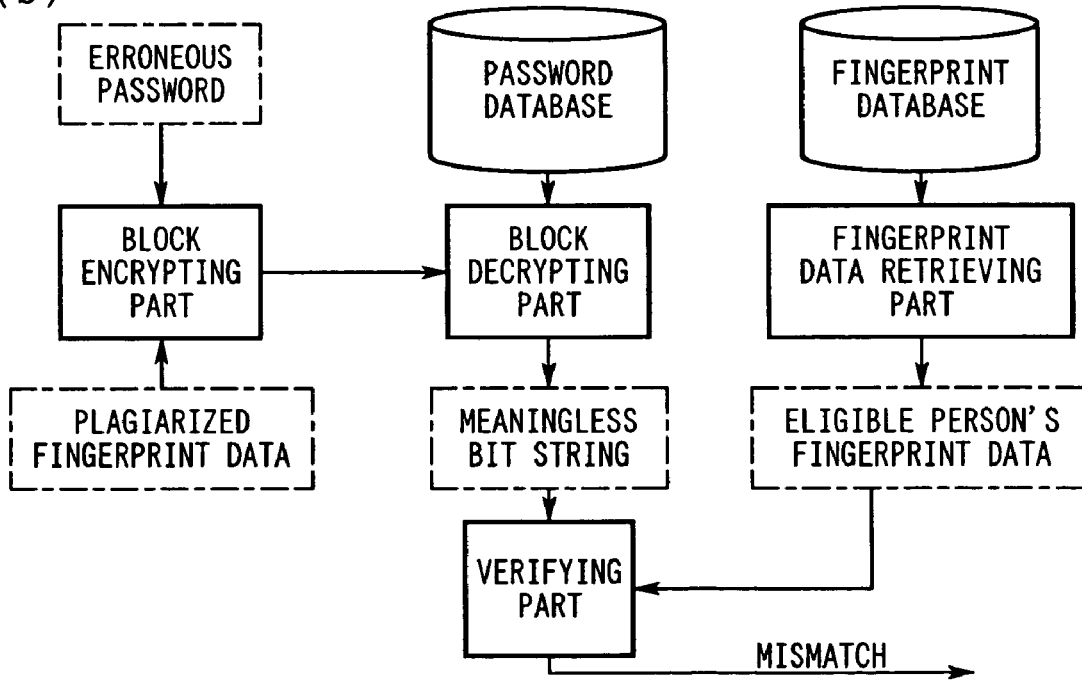

Fig. 17
(a)
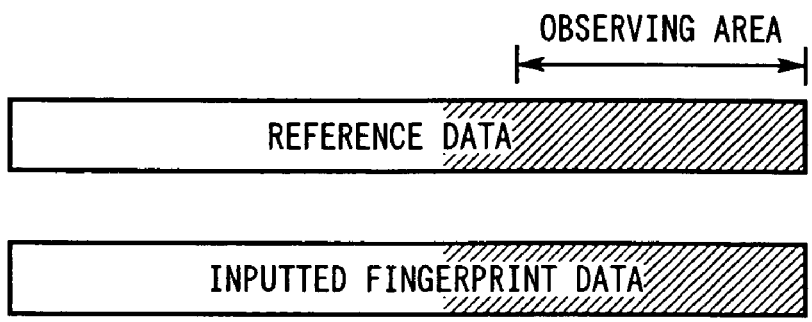
(b)
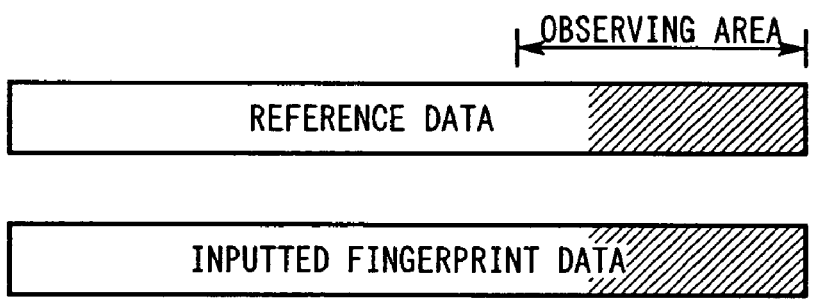
(c)
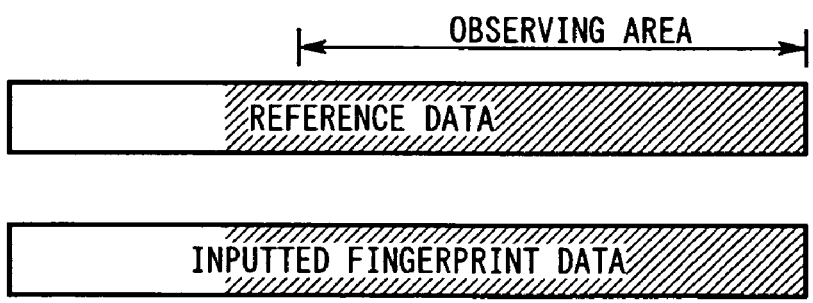
(d)
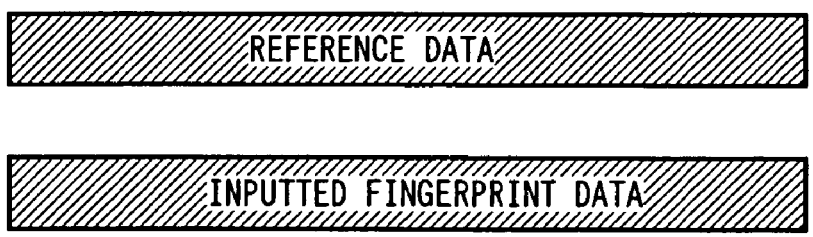

METHOD AND EQUIPMENT FOR ENCRYPTING/DECRYPTING PHYSICAL CHARACTERISTIC INFORMATION, AND IDENTIFICATION SYSTEM UTILIZING THE PHYSICAL CHARACTERISTIC INFORMATION

BACKGROUND OF THE INVENTION

1. Field of the Invention

The present invention relates to encryption/decryption method and equipment adapted for physical characteristic information such as fingerprints, voiceprints, palm patterns, facial appearances, or signatures representing a characteristic inherent to an individual, and to a remote identification system for identifying a person through a network according to the physical characteristic information.

The fingerprints, voiceprint, iris patterns or the like are characteristics inherent to an individual and are invariable for the life of the individual so that they are excellent as information for identifying a person and are utilized in various identification systems such as an admission controlling system.

As an information-related device such as a personal computer spreads, on the other hand, a variety of information are vigorously sent and received through a network between end users to enhance the importance of commerce through the network and transmissions of documents.

In order to perform the commerce and the exchanges of important documents properly through the network, there has been needed a technique for sending and receiving information to prove each other through the network and for identifying the persons reliably between each other. So the physical characteristic information has been noted as the information for identifying the persons.

2. Description of the Related Art

FIG. 15 is a diagram showing a construction of a remote identification system of the prior art through a network.

The remote identification system shown in FIG. 15 is constructed such that a client-side identification equipment 410 sends authenticating information through the network, and such that a server-side identification equipment 420 identifies the person of the client-side identification equipment 410, according to the result of comparison between the received authenticating information and the registered authenticating information.

When a personal computer communication service is utilized, for example, the end user's personal computer is the client-side identification equipment, and the host computer of a service provider is the server-side identification equipment.

In this case, according to a user's ID and a password inputted through a keyboard 411, the authenticating information is generated by a request controlling part 412 and is sent to the network by a transmission controlling part 413.

At this time, the aforementioned password is encrypted by an encrypting part 414, and this encrypted password is used in the request controlling part 412 to generate the authenticating information so that the password can be safely transferred through the network to the server-side identification equipment 420.

In the server-side identification equipment 420 shown in FIG. 15, the aforementioned encrypted password is received by a transmission controlling part 422 and transferred to a decrypting part 421. Accordingly, the decrypting part 421 decrypts the encrypted password and transfers the password to an identification controlling part 423.

On the other hand, the aforementioned user's ID is received by the transmission controlling part 422 and then transferred to the identification controlling part 423. According to this user's ID, the identification controlling part 423 retrieves the registered password from a password database 424, and compares this password with the password restored by the decrypting part 421.

In this case, if the restored password and the registered password match each other, the identification result having confirmed the identity is informed to the client-side identification equipment 410 by the transmission controlling part 422. Accordingly, the request controlling part 412 generates a message indicating the identification result and informs the person of the fact that the permission was acknowledged, by a display (CRT) 415.

As shown in FIG. 15, on the other hand, the encrypting part 414 may encrypt the password by using the current time on the system, as received from the digital timing unit 416, and the decrypting part 421 may decrypt the encrypted password by using the current time on the system, as received from a digital timing unit 425.

In this case, the password inputted by the person can be converted into a different cryptogram each time so that it can be safely sent and received through the network.

In this remote identification system, the inputted password is the information for identifying the person so that the password has to be properly managed by each person so as to identify the person reliably to exclude others.

On the other hand, the physical characteristic information is inherent to an individual and is excellent as one for the identification so that it is utilized as the authenticating information for the persons in the admission controlling system, for example.

FIG. 16 is a diagram showing an example of the construction of the identification system utilizing the physical characteristic information.

FIG. 16 shows the case in which the information representing a feature of a fingerprint is used as the physical characteristic information. This identification system is constructed to include a fingerprint reader 430 and fingerprint identification equipment 440.

In this identification system, the fingerprint reader 430 acquires the information featuring the fingerprint of a person being present at the site as a series of numeric data and inputs the aforementioned information to the fingerprint identification equipment 440 through an identification controlling part 401.

A set of numeric data representing the feature of a fingerprint will be referred to as the "fingerprint data".

In the fingerprint reader 430 shown in FIG. 16, a feature extracting part 431 receives the image data read by an image inputting part 432, and extracts the feature of the fingerprint appearing in that image.

The features, as extracted by the feature extracting part 431, are arrayed according to a predetermined format by a fingerprint data generating part 433, and the fingerprint data thus generated are transferred to the identification controlling part 401.

In the fingerprint identification equipment 440 shown in FIG. 16, a fingerprint database 441 is registered with the user's ID given to an individual having an admission and fingerprint data (hereunder referred to as "reference data") obtained by measuring the related individuals. On the other hand, the user's ID inputted from a keyboard 402 is transferred to a fingerprint data retrieving part 442 by the identification controlling part 401, so that the related fingerprint data are retrieved from the aforementioned fingerprint database 411 by the fingerprint data retrieving part 442 based on that user's ID and subjected to the processing of a verifying part 444.

Here, the numeric data obtained by measuring the physical characteristic information including fingerprints generally fluctuate at each measurement by the condition for the measurement.

By the pressure to be applied to a finger when the finger is pushed to the image inputting part 432, the temperature of the finger or the ambient humidity, for example, the image data to be read change in a subtle way. Accordingly, the patterns of ridge flows in an image of the fingerprint and the distributions of the ridge points or the ridge bifurcations fluctuate.

According to the recognition rate required, therefore, the verifying part 444 decides whether or not the inputted fingerprint data belong to the eligible person[TI1], depending upon whether or not components in a predetermined area of the inputted fingerprint data are equivalent to the components in the corresponding area of the reference data.

FIG. 17 is a diagram for explaining a processing for comparing the physical characteristic information.

For an application to allow a misidentification of about one to one hundred, for example, the verifying part 444 may compare a limited portion of the inputted fingerprint data with the reference data, as illustrated as a observing area in FIG. 17A, and may inform the identification controlling part 401 whether or not the variance of all the components contained in the observing area is within a predetermined allowable range.

If the variance between the individual components of the reference data and the individual components of the inputted fingerprint data is within the allowable range in the hatched area of FIG. 17A, for example, the verifying part 444 informs the identification controlling part 401 of the fact that the inputted fingerprint data and the reference data are equivalent.

In response to this, the identification controlling part 401 may identify the person, have a displaying part 403 display that the person is admitted, and perform the necessary controls such as unlocking the door by utilizing the function of the admission controlling part 404.

If the variance of a portion of the component included in the aforementioned observing area exceeds the allowable range, as illustrated in FIG. 17B, the verifying part 444 may inform that the reference data and the inputted fingerprint data are not equivalent. In response to this, the identification controlling part 401 may perform the controls necessary for denying the admission of the person.

Here, if the fingerprint data are recognized by using the relatively narrow area as the observing area, as illustrated in FIG. 17A, a misidentification of about one to one hundred may occur, but the possibility of excluding the person can be lowered even if the condition for measuring the fingerprint data is poor.

For an application requiring a misidentification of about one to ten thousands, on the other hand, most of the fingerprint data has to be confined in the observing area, as illustrated in FIG. 17C.

In this case, the possibility of the misidentification can be lowered, but the possibility that even the person able to be admitted may be denied because of having slight dirtiness of the fingertip will rise. This is because the wider the observing area the larger the possibility that the variance between the individual components of the inputted fingerprint data and the individual components of the reference data may exceed the allowable range.

As the technique for transmitting the information safely through the network, there was already practiced the RSA algorithm for realizing the public key system or the DES (Data Encryption Standard) method applying the common key system.

The DES method is a cryptographic method for dividing the information to be encrypted into blocks of a unit of 64 bits and for converting the individual blocks by combining a substitution cipher and a transposition cipher complicatedly. The DES method is called the "block encryption" because the conversion unit is the block.

In the aforementioned remote identification system of the prior art, the password or the information for providing the identity is basically left to the management of an individual.

In order to block the plagiarism of the password, on the other hand, it is required that the password has a sufficient length, be a meaningless string of characters and be frequently changed. This makes it difficult for the individual to manage the password properly.

This is because a person finds it difficult to memorize the meaningless string of characters or symbols, and because the necessity of frequent change is too heavy a burden for the person.

As a matter of fact, most users register such passwords as can be easily analogized from the personal information being opened to the public or the kind of information to be preferably accessed to, record and carry the memorandum of the password or forget to change the password for a long time.

In the remote identification system using only the password as the information for identifying the person, therefore, it is difficult to ensure the safety necessary for the e-commerce or for sending and receiving the important information.

By introducing the remote identification system using the physical characteristic information in place of the password as the information for the identification, it is possible to block fraudulent access. So important information can be sent and received safely through the network.

FIG. 18 shows an example of the construction of the remote identification system utilizing the physical characteristic information.

In the client-side identification equipment 410 shown in FIG. 18, the fingerprint data obtained by the fingerprint reader 430 are encrypted by the encrypting part 414, and the obtained cryptogram is sent in place of the password to the network by the transmission controlling part 413.

This cryptogram is received by the transmission controlling part 422 provided in the server-side identification equipment 420 and is then transferred to the decrypting part 421 by the identification controlling part 401. In response to this, the decrypting part 421 decrypts the aforementioned cryptogram to restore the original fingerprint data, which are transferred together with the user's ID to the fingerprint identification equipment 440.

Premising that the physical characteristic information contains fluctuations and noises, when exactly the same physical characteristic information as the previously inputted one is inputted, that physical characteristic information is judged to have been plagiarized. Then, the attack using the plagiarized authenticating information can be blocked, making it possible to send and receive the information more safely.

The attack to break the protection of the remote identification system by using the plagiarized authenticating information will be referred to as "replay attack".

Here will be described an example of the remote identification system considering that replay attack.

In the remote identification system shown in FIG. 18, the replay attack is partially blocked by storing the fingerprint database 441 with not only the reference data related to each user's ID but also the registered fingerprint data that is previously inputted, by comparing the inputted fingerprint data with the reference data and the registered fingerprint data by a comparing part 445 provided in a verifying part 444, and by subjecting the result of comparison to the [TI2]processings of a fraud detecting part 446 and of a recognizing deciding part 447.

Here, according to the comparison result received from the comparing part 445, the fraud detecting part 446 shown in FIG. 18 decides whether or not all the numeric data comprising the inputted fingerprint data and the corresponding numeric data of the reference data or the registered fingerprint data completely match, and informs, if they match, the recognizing deciding part 447 of the detection of the replay attack.

According to the comparison result received from the comparing part 445, on the other hand, the recognizing deciding part 447 decides whether or not the variance between the individual components of the inputted fingerprint data and the individual components of the reference data is within a predetermined allowable range, and further whether or not the inputted fingerprint data belong to the eligible person, according to the decision result and the detection result of the fraud detecting part 446, and informs this result of decision as the result of recognition to the identification controlling part 401.

In this case, it is conditions necessary for identifying a person that the inputted fingerprint data are equivalent to the reference data over the area covering the observing area, as illustrated in FIG. 17A, and that all the numeric data comprising the inputted fingerprint data are not completely equal to the corresponding numeric data contained in the reference data or the registered fingerprint data.

Here, the cryptographic technique of the prior art, as represented by the aforementioned DES method, regards the difficulty at the time of restoring the original information from the cryptogram as important, and converts the original information by a complicated cryptographic algorithm. This makes it seriously difficult to decrypt the encrypted physical characteristic information to obtain the original physical characteristic information.

Since the physical characteristic information itself is inherent to each person, on the other hand, the information is extremely difficult to plagiarize or forge so long as it is properly managed.

Since the process for the encrypted physical characteristic information to be transmitted through the network has almost no protection, however, it is relatively easy to acquire that information fraudulently.

When the encrypted physical characteristic information fraudulently acquired by the wiretapping method or the like is utilized as it is, it can naturally be excluded as the replay attack, as has been described above.

When the fraudulently acquired encrypted physical characteristic information is partially altered, however, the decrypted physical characteristic information may satisfy the conditions necessary for identification described above by the influence of the alteration upon the decrypted physical characteristic information.

Because the fingerprint data having been encrypted by the aforementioned encrypting part 414 using the block encrypting method such as the DES method are decrypted for each block as in the encryption by the decrypting part 421 so that the influence of the alteration of the encrypted physical characteristic information is exerted only locally on the portion which is obtained by decrypting the altered portion, but not on the other portion.

As illustrated in FIG. 19, therefore, pseudo fluctuations can be synthesized in the decrypted fingerprint data by fraudulently acquiring the encrypted fingerprint data in the network and by altering a portion (as hatched in FIG. 19) of the encrypted fingerprint data to input as new authenticating information.

When a portion of the encrypted fingerprint data derived from the portion other than the observing area is altered, as illustrated in FIG. 19, the fingerprint data obtained by the decrypting part 421 are different at the decryption result of the altered portion from the corresponding portion of the original fingerprint data but are completely equivalent in the observing area to the original fingerprint data.

In other words, the decryption result obtained from the altered encrypted fingerprint data is equivalent over the observing area to the reference data but does not completely match either the reference data or the registered fingerprint data.

In this case, the variance, caused in the decryption result by altering the encrypted fingerprint data, from the original fingerprint data is regarded as the fluctuations of the fingerprint data by the recognizing deciding part 447, and the fraudulent attack using the altered encrypted fingerprint data may be allowed.

Therefore, any simple application of the cryptographic technique of the prior art could not enable the system for the identifying by sending and receiving the physical characteristic information through the network, to improve the security, which is expected by utilizing the physical characteristic information.

SUMMARY OF THE INVENTION

An object of the invention is to provide an elementary technique capable of restoring original physical characteristic information so as to block attacks against the security system by re-utilizing encrypted information.

Another object of the invention is to provide an identification system utilizing the authenticating information generated according to the physical characteristic information.

The above objects are achieved by a cryptographic method comprising the steps of: receiving physical characteristic information representing a characteristic inherent to an individual; randomly determining a numeric key; generating a cryptographic key from said numeric key and a predetermined primary key; encrypting said physical characteristic information using said cryptographic key and; generating an auxiliary code for decrypting said cryptographic key, from the encrypted physical characteristic information and said numeric key.

In this cryptographic method, the auxiliary code depends upon the encrypted physical characteristic information. Therefore, the cryptographic key to be restored according to the auxiliary code necessarily depends upon the physical characteristic information. So by forming cryptogram from the encrypted physical characteristic information and the auxiliary code, the cryptographic key to be utilized for decrypting the encrypted physical characteristic information depends upon the entire cryptogram.

The above objects are achieved by a decryption method comprising the steps of: receiving an encrypted physical characteristic information and an auxiliary code; restoring a numeric key from said received data; restoring cryptographic key from said numeric key and a predetermined primary key; and decrypting said encrypted physical characteristic information by using said cryptographic key and obtaining physical characteristic information. In this decryption method, the original physical characteristic information can be restored by decrypting the encrypted physical characteristic information obtained by the aforementioned cryptographic method, using the cryptographic key assumed to be used in encrypting physical characteristic information.

The above objects are achieved by a cryptographic equipment comprising: an inputting section for inputting physical characteristic information representing a characteristic inherent to an individual; numeric key generating section for randomly determining numeric key; key generating section for generating a cryptographic key from said numeric key and a predetermined primary key; encrypting section for encrypting said physical characteristic information using said cryptographic key; and code generating section for generating an auxiliary code from said encrypted physical characteristic information and said numeric key.

In this cryptographic equipment, as reasoned in the aforementioned description on the cryptographic method, the cryptogram capable of restoring the original physical characteristic information can be generated only when decrypted by using the cryptographic key depending upon the entire cryptogram, by forming the cryptogram from encrypted physical characteristic information and the auxiliary code.

The above objects are achieved by a decrypting equipment comprising: receiving section for receiving an encrypted physical characteristic information and an auxiliary code; numeric key restoring section for restoring a numeric key from said encrypted physical characteristic information and said auxiliary code; key generating section for generating a cryptographic key from said numeric key and a predetermined primary key; and decrypting section for decrypting said encrypted physical characteristic information by using said cryptographic key.

In this decrypting equipment, the cryptographic key to be used for the decryption is generated according to the depending relationship between the encrypted physical characteristic information and the auxiliary code. Therefore, the cryptographic key used for encrypting the physical characteristic information can be restored, and then the original physical characteristic information can be restored by the decrypting processing of the decrypting section only when no alteration is applied to the received data.

The above objects are achieved by a storage media for storing a program to be executed by a computer, comprising: a inputting procedure for inputting physical characteristic information representing a characteristic inherent to an individual; a numeric key generating procedure for randomly determining a numeric key; a key generating procedure for generating a cryptographic key from said numeric key and a predetermined primary key; an encrypting procedure for encrypting said physical characteristic information using said cryptographic key; and a code generating procedure for generating an auxiliary code from said encrypted physical characteristic information and said numeric key.

By using this storage media storing such program, the depending relationship can be established between the auxiliary code and the encrypted physical characteristic information. Therefore, the restoration of the original physical characteristic information can be assured, so long as the combination between the encrypted physical characteristic information and the auxiliary code is subjected as it is to the decrypting processing, but the restoration can be blocked When the encrypted physical characteristic information or the auxiliary code is altered.

The above objects are achieved by a storage media for storing a program to be executed by a computer, comprising: a receiving procedure for receiving a cryptogram including an encrypted physical characteristic information and an auxiliary code; a numeric key restoring procedure for restoring a numeric key from said encrypted physical characteristic information and said auxiliary code; a key generating procedure for generating a cryptographic key from said numeric key and a predetermined primary key; and a decrypting procedure for decrypting said encrypted physical characteristic information by using said cryptographic key.

By using this storage media storing such program, the cryptographic key used in the encrypting processing can be restored by utilizing the depending relationship between the encrypted physical characteristic information and the auxiliary code, and then the original physical characteristic information can be restored through the first decrypting procedure.

The above objects are achieved by a cryptographic method comprising the steps of: receiving physical characteristic information representing a characteristic inherent to an individual; arithmetically converting each component of said physical characteristic information by using a predetermined function concerning said each component and a plurality of components having a predetermined relationship with said each component, to scramble said physical characteristic information; and encrypting the scrambled physical characteristic information by using the predetermined cryptographic key.

By reflecting the contents of a plurality of blocks having the predetermined relationships with each block which are components comprising the physical characteristic information, upon the result of encryption obtained for each block, according to the cryptographic method, the depending relationship can be established between each block of the encrypted physical characteristic information and a plurality of blocks comprising the physical characteristic information, irrespective of the length of each unit of process in the encryption.

The above objects are achieved by a decryption method comprising the steps of: receiving a cryptogram which is an encryption of scrambled physical characteristic information; decrypting said cryptogram by using the predetermined cryptographic key and obtaining said scrambled physical characteristic information; and descrambling said scrambled physical characteristic information by removing each element from each component constructing the result of decryption, in which each element is effected at the time of scrambling, by a plurality of components that has a predetermined relationship with said each component.

In this decryption method, when the cryptogram generated by the encrypting processing is received as it is, the result of decryption can be descrambled to restore the original physical characteristic information.

When the cryptogram is altered, on the other hand, the block obtained by decrypting the altered portion is different from that to be intrinsically obtained. Because this difference influences the descrambled result over a plurality of blocks having a depending relationship with such block, so that the original physical characteristic information cannot be restored irrespective of the length of each unit of processing in the decryption.

The above objects are achieved by a cryptographic equipment comprising: inputting section for inputting physical characteristic information representing a characteristic inherent to an individual; scrambling section for arithmetically converting each component of said physical characteristic information by using a predetermined function concerning said each component and a plurality of components having a predetermined relationship with said each component, to scramble said physical characteristic information; and encrypting section for encrypting the scrambled physical characteristic information by using the predetermined cryptographic key.

In this cryptographic equipment, there can be obtained the cryptogram, in which each block comprising the cryptogram depends upon the information included in a plurality of blocks comprising the physical characteristic information. Therefore, the restoration of the original physical characteristic information can be assured, as long as the cryptogram is subjected as it is to the decrypting processing, but the restoration can be blocked if the cryptogram is altered even partially.

The above objects are achieved by a decrypting equipment comprising: decrypting section for decrypting a received cryptogram which is an encryption of a scrambled physical characteristic information, by a predetermined cryptographic key and obtaining said scrambled physical characteristic information and descrambling section for descrambling said scrambled physical characteristic information.

In this decrypting equipment, when the cryptogram sent by the cryptographic equipment is received as it is, the original physical characteristic information can be restored by descrambling the result of decryption.

When the cryptogram is altered, on the other hand, the block obtained by decrypting the altered portion is different from that to be intrinsically obtained. Because this difference influences the descrambled result over a plurality of blocks having a depending relationship with such block, the original physical characteristic information cannot be restored irrespective of the length of each unit of processing in the decryption.

The above objects are achieved by a storage media for storing a program to be executed by a computer, comprising: a inputting procedure for inputting physical characteristic information representing a characteristic inherent to an individual; a scrambling procedure for arithmetically converting each component of said physical characteristic information by using a predetermined function concerning said each component and a plurality of components having a predetermined relationship with said each component, to scramble said physical characteristic information; and a encrypting procedure for encrypting the scrambled physical characteristic information by using the predetermined cryptographic key.

By using this storage media stored with such program, there can be obtained the result of encryption, in which each block comprising the cryptogram depends upon the information included in a plurality of blocks comprising the physical characteristic information. Therefore, the restoration of the original physical characteristic information can be assured, as long as the cryptogram is subjected as it is to the decrypting processing, but the restoration can be blocked when the cryptogram is altered even partially.

The above objects are achieved by a storage media for storing a program to be executed by a computer, comprising: a decrypting procedure for decrypting a received cryptogram which is an encryption of a scrambled physical characteristic information, by a predetermined cryptographic key and obtaining said scrambled physical characteristic information and a descrambling procedure for descrambling said scrambled physical characteristic information.

By using this storage media stored with the program, the scramble made on the result of decryption can be descrambled to restore the original physical characteristic information when the cryptogram generated in the encrypting procedure is received as it is.

When the cryptogram is altered, on the other hand, the block obtained by decrypting the altered portion is different from that to be intrinsically obtained. Because this difference influences the descrambled result over a plurality of blocks having a depending relationship with such block, the original physical characteristic information cannot be restored irrespective of the length of each unit of processing in the decryption.

The above objects are achieved by a remote identification system comprises a client-side equipment and server-side equipment, wherein: said client-side equipment comprising inputting means for inputting physical characteristic information representing a characteristic inherent to an individual; proof information inputting means for inputting information including identifier or identifying an individual and a password; encrypting means for encrypting said physical characteristic information using said password as a cryptographic key and outputting a cryptogram; and a outputting means for outputting authenticating information generated from said cryptogram and said identifier; said server-side equipment comprising registering means for registering password and reference data which is obtained by measuring a physical characteristic corresponding to each individual, relating to given identifier corresponding to each person; receiving means for receiving authenticating information consisting of said cryptogram and said identifier; retrieving means for retrieving a relating password and reference data from said registering means in accordance to received identifier; decrypting means for decrypting said received cryptogram by using the password retrieved by said retrieving means as a cryptographic key and obtaining a physical characteristic information; and examining means for examining whether or not said physical characteristic information and retrieved reference data are equivalent.

In this remote identification system, the authenticating information containing the encrypted physical characteristic information represented by bit patterns different for each identifying processing can be generated and sent to the server-side equipment. When this authenticating information is transmitted as it is, in the server-side equipment, the information on physical characteristic inputted in the client-side equipment for identification is restored. And then the identification can be reliably made by examining the equivalency between the restored physical characteristic information and the registered reference data by the examining section while considering the fluctuation of the physical characteristic information.

Here, the further objects and features of the invention will be described more specifically in the following description to be made with reference to the accompanying drawings.

BRIEF DESCRIPTION OF THE DRAWINGS

The nature, principle, and utility of the invention will become apparent from the following detailed description when read in conjunction with the accompanying drawings in which like parts are designated by identical reference numbers, in which:

FIG. 4 is a block diagram illustrating the principles of a cryptographic equipment and a decrypting equipment according to one of the preferred embodiments of the invention;

FIG. 8 is a diagram for explaining the operations of the first embodiment of the invention;

FIG. 11 is a diagram for explaining an effect of preventing analysis of a processing for recognition on physical characteristic information;

FIG. 14 is a diagram for explaining a fraudulent access blocking;

FIG. 17 is a diagram for explaining the comparing processing on physical characteristics;

DESCRIPTION OF THE PREFERRED EMBODIMENTS

[Principles]

First of all, here will be described the principles of a cryptographic method and a decrypting method, a cryptographic equipment and a decrypting equipment, and an identification system according to a preferred embodiment of the invention.

Figure 1:
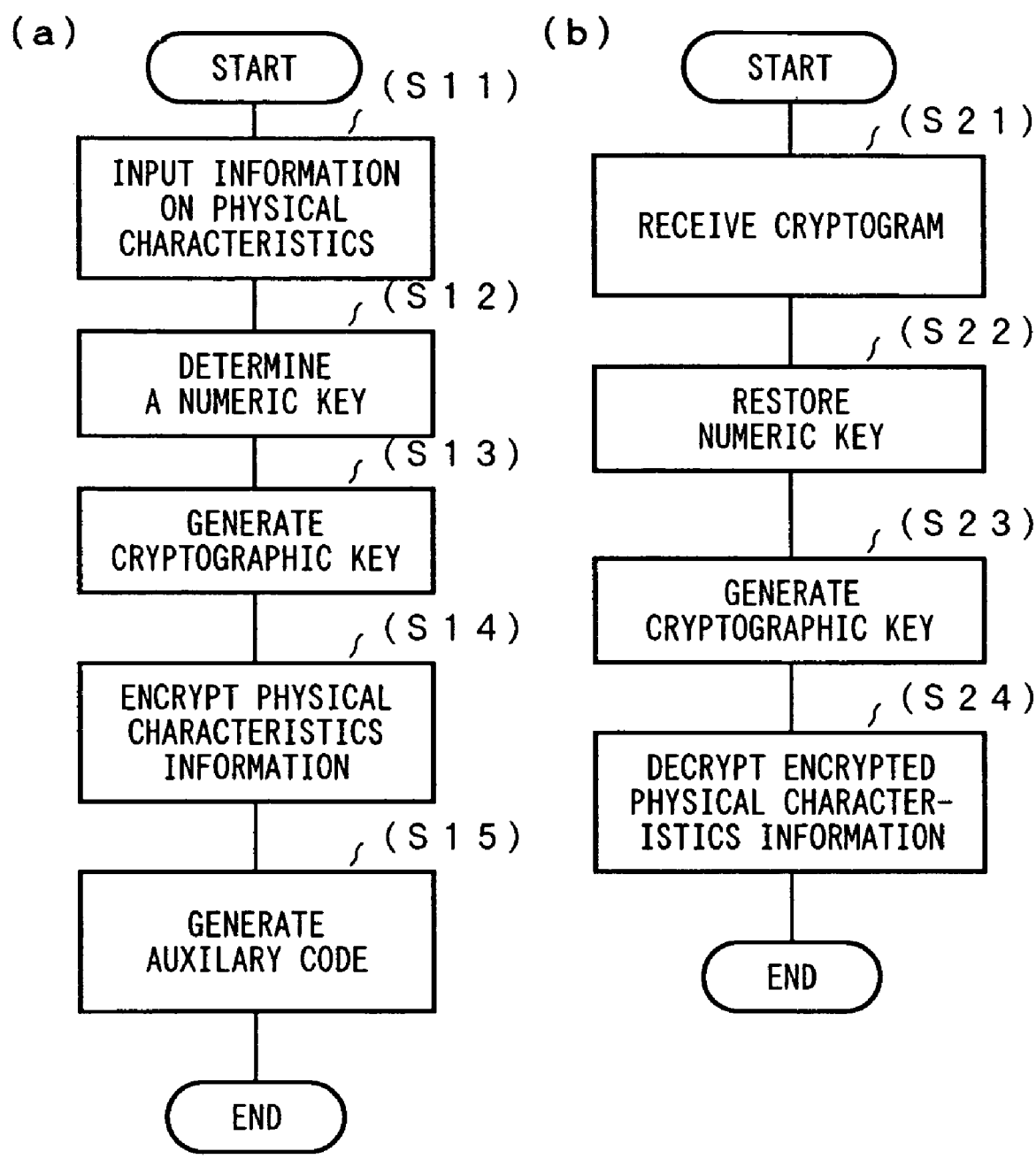
FIG. 1 is a diagram illustrating the principles of a cryptographic method and a decrypting method according to one of the preferred embodiments of the invention.

FIG. 1A is a diagram illustrating the principle of a cryptographic method according to one of the preferred embodiments of the invention.

The cryptographic method, as shown in FIG. 1A, is constructed to include: a step (S11) of inputting physical characteristic information; a step (S12) of determining a numeric key; a step (S13) of generating a cryptographic key; an encryption step (S14); and a step (S15) of generating an auxiliary code.

The principle of the cryptographic method according to one of the preferred embodiments of the invention will be described in the following.

In the inputting step (S11), the physical characteristic information representing a characteristic inherent to an individual is received. In the numeric key determining step (S12), a numeric key is determined randomly. In the cryptographic key generating step (S13), the cryptographic key is generated from the numeric key and a predetermined primary key. In the encryption step (S14), the physical characteristic information is encrypted by using the cryptographic key. In the code generating step (S15), an auxiliary code is generated from the encrypted physical characteristic information and the numeric key.

The operations of the cryptographic method will be described in the following.

At each encryption, according to the numeric key determined at the numeric key determining step (S12), the cryptographic key is generated at the cryptographic key generating step (S13), and the physical characteristic information inputted at the inputting step (S11) is encrypted at the encryption step (S14) by using that cryptographic key. According to the encrypted physical characteristic information thus obtained and the aforementioned numeric key, on the other hand, the auxiliary code is generated at the code generating step (S15).

Thus, a depending relationship is established between the auxiliary code and the encrypted physical characteristic information.

By providing the encrypted physical characteristic information and the auxiliary code for the decryption and by restoring the cryptographic key in the decryption according to the aforementioned auxiliary code, therefore, the decryption of the encrypted physical characteristic information is carried out by the cryptographic key depending upon the encrypted physical characteristic information.

FIG. 1B is a diagram illustrating the principle of the decrypting method according to one of the preferred embodiments of the invention.

The decrypting method, as shown in FIG. 1B, include a receiving step (S21), a numeric key restoring step (S22), a cryptographic key restoring step (S23) and a decrypting step (S24).

The principle of the decrypting method according to one of the preferred embodiments of the invention will be described in the following.

In the receiving step (S21), an encrypted physical characteristic information and an auxiliary code are received as a cryptogram. In the numeric key restoring step (S22), a numeric key is restored from the encrypted physical characteristic information and the auxiliary code. Next, in the cryptographic key restoring step (S23), a cryptographic key is restored from the numeric key and a predetermined primary key. In the decrypting step (S24), the encrypted physical characteristic information is decrypted by using the cryptographic key and physical characteristic information is restored.

The operations of the decrypting method will be described in the following.

When the receiving step (S21) receives the encrypted physical characteristic information and the auxiliary code, the numeric key is restored at the numeric key restoring step (S22), and the cryptographic key is restored at the cryptographic key restoring step (S23) according to the numeric key and the primary key. It depends upon the propriety of the encrypted physical characteristic information whether or not the cryptographic key thus obtained is correct. Only when the proper encrypted physical characteristic information arrives, therefore, the original physical characteristic information can be restored at the restoring step (S24).

Figure 2:
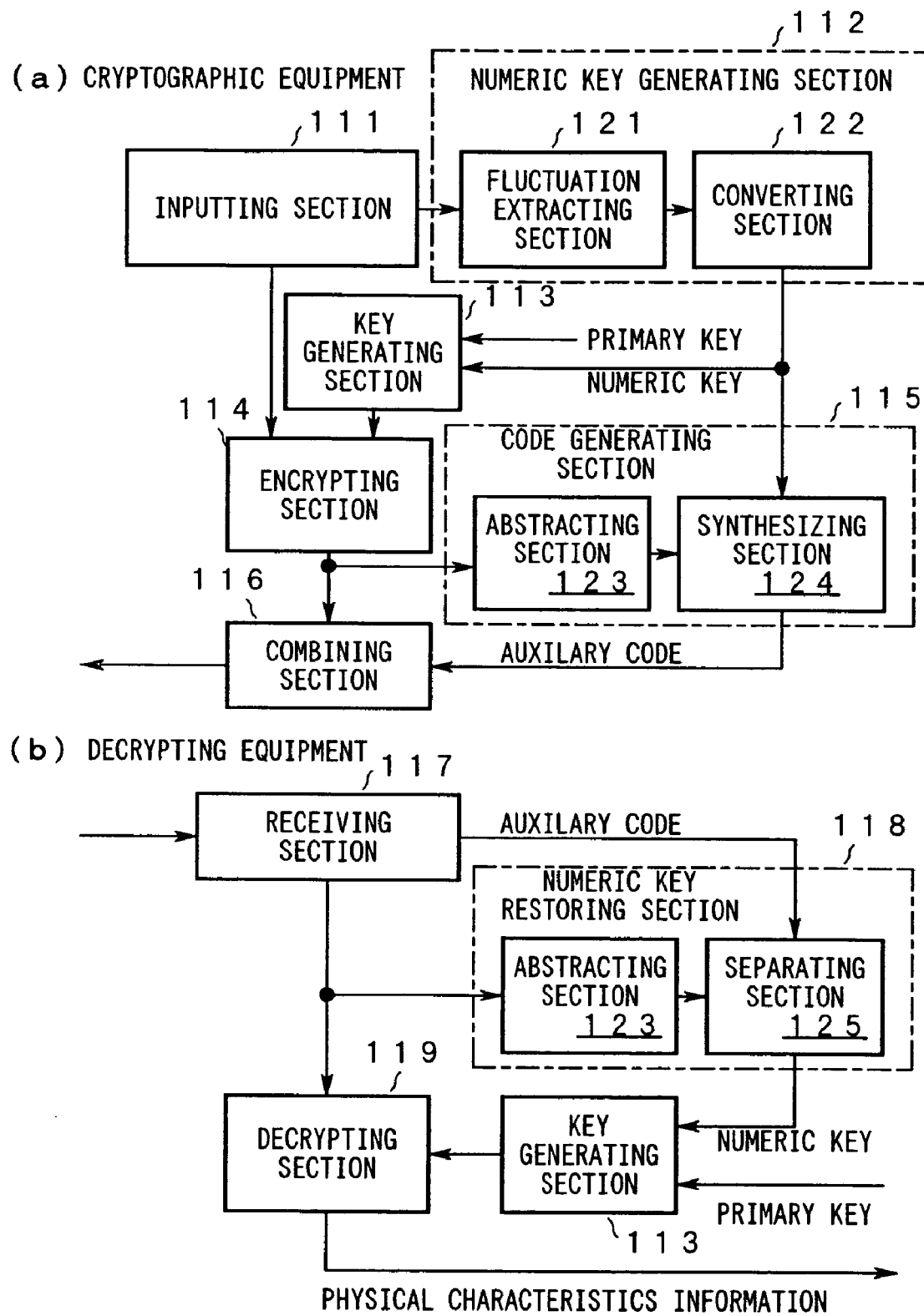
FIG. 2 is a block diagram illustrating the principles of a cryptographic equipment and a decrypting equipment according to one of the preferred embodiments of the invention.

FIG. 2A is a block diagram showing the principle of a cryptographic equipment according to one of the preferred embodiments of the invention.

The cryptographic equipment, as shown in FIG. 2A, is constructed to include physical characteristic inputting section 111, numeric key determining section 112, key generating section 113, encrypting section 114, generating section 115 and combining section 116.

The principle of the cryptographic equipment according to one of the preferred embodiments of the invention will be described in the following.

The physical characteristic inputting section 111 inputs physical characteristic information representing a characteristic inherent to an individual. The numeric key determining section 112 determines a numeric key randomly. The key generating section 113 generates a cryptographic key from the numeric key and a predetermined primary key. The encrypting section 114 encrypts the inputted physical characteristic information by using the cryptographic key. The code generating section 115 generates an auxiliary code from the encrypted physical characteristic information and the numeric key.

The operations of the cryptographic equipment thus constructed will be described in the following.

At each encryption, the numeric key is generated by the numeric key determining section 112, and this numeric key is used to generate the cryptographic key by the key generating section 113. When the encrypting section 114 performs the encryption by using the cryptographic key, therefore, the physical characteristic information inputted by the inputting section 111, is encrypted by using a onetime cryptographic key. According to the encrypted physical characteristic information thus obtained and the aforementioned numeric key, on the other hand, the auxiliary code is generated by the code generating section 115.

Thus, the auxiliary code is generated according to the encrypted physical characteristic information so that a depending relationship is established between the auxiliary code and the encrypted physical characteristic information.

So, a cryptogram generated from the encrypted physical characteristic information and auxiliary code is subjected to decrypting processing, the cryptographic key in the decryption is restored according to the aforementioned auxiliary code. Therefore, the decryption of the encrypted physical characteristic information is performed by the cryptographic key depending upon the encrypted physical characteristic information.

FIG. 2B is a block diagram illustrating the principle of a decrypting equipment according to one of the preferred embodiments of the invention.

The decrypting equipment, as shown in FIG. 2B, is constructed to include receiving section 117, numeric key restoring section 118, the key generating section 113 and decrypting section 119.

The principle of the decrypting equipment according to one of the preferred embodiments of the invention will be described in the following.

The receiving section 117 receives the encrypted physical characteristic information and an auxiliary code. The numeric key restoring section 118 restores a numeric key from the encrypted physical characteristic information and the auxiliary code. The key generating section 113 generates a cryptographic key from the numeric key and a predetermined primary key. The decrypting section 119 decrypts the encrypted physical characteristic information by using the cryptographic key.

The operations of the decrypting equipment thus constructed will be described in the following.

According to the encrypted physical characteristic information and the auxiliary code received through the receiving section 117, the numeric key is restored by the numeric key restoring section 118, and the cryptographic key is generated by the key generating section 113 according to the restored numeric key.

It depends upon the propriety of the encrypted physical characteristic information whether or not the cryptographic key thus obtained is correct. Only when the proper encrypted physical characteristic information arrives, therefore, the original physical characteristic information can be restored by the decrypting section 119.

On the other hand, a encryption program according to one of the preferred embodiments of the invention is constructed to include an inputting procedure, a numeric key determining procedure, a cryptographic key generating procedure, an encrypting procedure and a code generating procedure.

The principle of the encryption program according to one of the preferred embodiments of the invention will be described in the following.

In the inputting procedure, physical characteristic information representing a characteristic inherent to an individual is inputted. In the numeric key determining procedure, a numeric key is randomly determined. In the key generating procedure, a cryptographic key is generated from the numeric key and a predetermined primary key. In the encrypting procedure, the inputted physical characteristic information is encrypted by using the cryptographic key. In the code generating procedure, an auxiliary code is generated according to the encrypted physical characteristic information and the numeric key.

The operations of the encryption program thus constructed will be described in the following.

The numeric key obtained by the numeric key determining procedure is used to generate the onetime cryptographic key by the key generating procedure, and the physical characteristic information inputted in the inputting procedure is encrypted in the encrypting procedure by the aforementioned cryptographic key. In the code generating procedure, on the other hand, the auxiliary code is generated according to the encrypted physical characteristic information and the aforementioned numeric key.

Thus, a depending relationship is established between the auxiliary code and the encrypted physical characteristic information. The restoration of the original physical characteristic information is assured, so long as the encrypted physical characteristic information and the auxiliary code are subjected as they are to the decrypting processing, but is completely impossible according to the alteration of the encrypted physical characteristic information or the auxiliary code.

On the other hand, a decryption program according to one of the preferred embodiments of the invention is constructed to include a receiving procedure, a numeric key restoring procedure, a key generating procedure and a decrypting procedure.

The principle of the decryption program according to one of the preferred embodiments of the invention will be described in the following.

In the receiving procedure, acryptogram including the encrypted physical characteristic information and an auxiliary code are received. In the numeric key restoring procedure, a numeric key for the generation of a cryptographic key is restored according to the encrypted physical characteristic information and the auxiliary code. In the key generating procedure, a cryptographic key is generated according to the numeric key and a predetermined primary key. In the decrypting procedure, the encrypted physical characteristic information is decrypted by using the cryptographic key.

The operations of the decryption program thus constructed will be described in the following.

According to the encrypted physical characteristic information and the auxiliary code received in the receiving procedure, the numeric key is restored by the numeric key restoring procedure, and the cryptographic key is generated by the key generating procedure according to the numeric key.

By utilizing a depending relationship between the encrypted physical characteristic information and the auxiliary code, therefore, the cryptographic key used in the encryption can be restored and subjected to the decrypting procedure only when both the encrypted physical characteristic information and the auxiliary code are correct.

Figure 3:
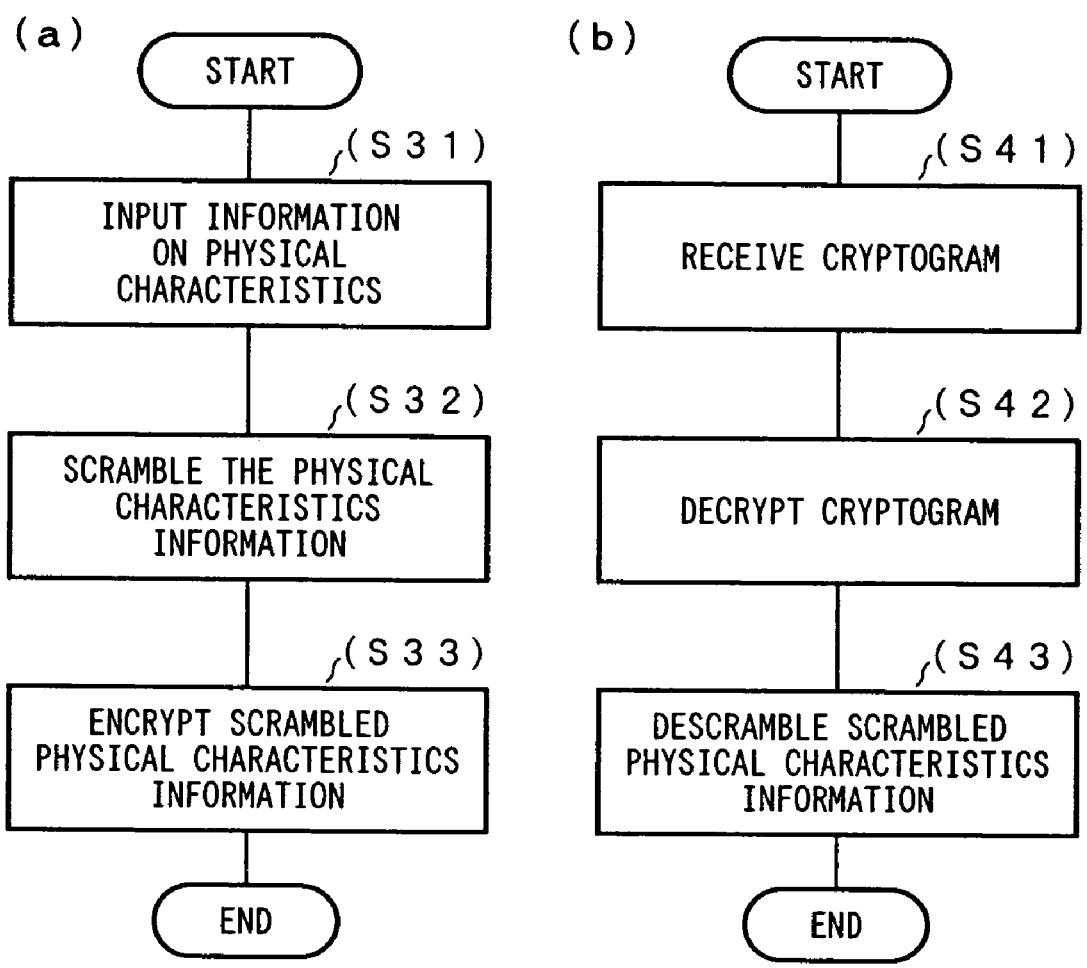
FIG. 3 is a diagram illustrating the principles of a cryptographic method and a decrypting method according to one of the preferred embodiments of the invention.

FIG. 3A shows the principle of a cryptographic method according to one of the preferred embodiments of the invention.

The cryptographic method, as shown in FIG. 3A, is constructed to include an inputting step (S31), a scrambling step (S32) and an encrypting step (S33).

The principle of the cryptographic method according to one of the preferred embodiments of the invention will be described in the following.

In the receiving step (S31), a physical characteristic information representing a characteristic inherent to an individual is received. In the scrambling step (S32), each component comprising the physical characteristic information is arithmetically converted by using a predetermined function concerning the each component and a plurality of components having a predetermined relationship with the each component, to be the physical characteristic information scrambled. In the encrypting step (S33), the scrambled physical characteristic information is encrypted by using a predetermined cryptographic key.

The operations of the cryptographic method thus constructed will be described in the following.

The physical characteristic information received at the receiving step (S31) is scrambled at the scrambling step (S32) by using the predetermined function and is encrypted at the encrypting step (S33).

In this case, therefore, the scrambled result reflecting each unit information (hereunder referred to as "block") comprising the original physical characteristic information and a plurality of blocks having the predetermined relationship with that block is subjected to an encrypting processing at the encrypting step (S32).

On the encrypted result obtained for each block comprising the physical characteristic information, therefore, there are reflected the contents of a plurality of blocks having the predetermined relationship with that block.

FIG. 3B shows the principle of a decryption method according to one of the preferred embodiments of the invention.

The decryption method, as shown in FIG. 3B, is constructed to include a receiving step (S41), a decrypting step (S42) and a descrambling step (S43).

The principle of the decryption method according to one of the preferred embodiments of the invention will be described in the following.

In the receiving step (S41), a cryptogram which is an encryption of scrambled physical characteristic information is received. In the decrypting step (S42), the cryptogram is decrypted by using a predetermined cryptographic key. In the descrambling step (S43), the result of decryption is descrambled by separating each element from each component constructing the result of decryption, in which each element is affected at the time of scrambling by a plurality of components that have a predetermined relationship with the each component.

The operations of the decryption method thus constructed will be described in the following.

The cryptogram is received at the receiving step (S41) and decrypted at the decrypting step (S42) and is then descrambled at the descrambling step (S43).

If a variance is established between the block obtained as a result of decryption and the block to be intrinsically obtained, therefore, the result of descrambling varies over a plurality of blocks having the depending relationship with that block. Irrespective of the length of a processing unit in the decrypting processing at the decrypting step (S42), therefore, the original physical characteristic information can be made seriously damaged by the alteration applied to the encrypted physical characteristic information.

FIG. 4A shows a block diagram showing the principle of a cryptographic equipment according to one of the preferred embodiments of the invention.

The cryptographic equipment, as shown in FIG. 4A, is constructed to include the inputting section 111, scrambling section 131 and encrypting section 132.

The inputting section 111 inputs physical characteristic information representing a characteristic inherent to an individual. The scrambling section 131 arithmetically converts each component comprising the physical characteristic information by using a predetermined function concerning the each component and a plurality of components having a predetermined relationship with the each component, to scramble the physical characteristic information. The encrypting section 132 encrypts the scrambled physical characteristic information by using a predetermined cryptographic key.

The operations of the cryptographic equipment thus constructed will be described in the following.

The information included in each block comprising the physical characteristic information inputted by the inputting section 111 is arithmetically converted by the scrambling section 131 together with the information included in a plurality of blocks having the predetermined relationship with that block and is then encrypted by the encrypting section 132.

On each block of the result of encryption obtained for each block of the physical characteristic information, therefore, there is reflected the information which is included in a plurality of blocks having the predetermined relationship with that block.

FIG. 4B is a block diagram showing the principle of a decrypting equipment according to one of the preferred embodiments of the invention.

The decrypting equipment, as shown in FIG. 4B, is constructed to include decrypting section 135 and descrambling section 136.

The principle of the decrypting equipment according to one of the preferred embodiments of the invention will be described in the following.

The decrypting section 135 decrypts a received cryptogram that is an encryption of scrambled physical characteristic information by using a predetermined cryptographic key, and obtains the scrambled physical characteristic information. The descrambling section 136 descrambles the scrambled physical characteristic information.

The operations of the decrypting equipment thus constructed will be described in the following.

The cryptogram inputted to the decrypting equipment is decrypted by the decrypting section 135 and is then descrambled by the descrambling section 136.

If the cryptogram is altered, therefore, the result obtained is considerably different from that of descrambling to be intrinsically obtained, so that the restoration of the original physical characteristic information is completely impossible.

On the other hand, an encryption program according to one of the preferred embodiments of the invention is constructed to include an inputting procedure, a scrambling procedure and an encrypting procedure.

The principle of the encryption program according to one of the preferred embodiments of the invention will be described in the following.

In the inputting procedure, physical characteristic information representing a characteristic inherent to an individual is inputted. In the scrambling procedure, each component of the physical characteristic information is arithmetically converted by using a predetermined function on the each component and a plurality of components having a predetermined relationship with the each component, and the physical characteristic information to be scrambled. In the encrypting procedure, the scrambled physical characteristic information is encrypted by using a predetermined cryptographic key.

The operations of the encryption program thus constructed will be described in the following.

The information included in each block of the physical characteristic information inputted by the inputting procedure is arithmetically converted in the scrambling procedure together with the information included in a plurality of blocks having the predetermined relationship with that block and is then encrypted in the encrypting procedure.

On each block of the result of encryption obtained for that block of the physical characteristic information, there is reflected the information which is included in a plurality of blocks having the predetermined relationship with that block.

On the other hand, a decryption program according to one of the preferred embodiments of the invention is constructed to include a decrypting procedure and a descrambling procedure.

The principle of the decryption program according to one of the preferred embodiments of the invention will be described in the following.

In the decrypting procedure, a received cryptogram which is an encryption of scrambled physical characteristic information is decrypted by using a predetermined cryptographic key, and scrambled physical characteristic information is obtained. In the descrambling procedure, the scrambled physical characteristic information is descrambled by arithmetically converting the scrambled physical characteristic information by using a predetermined function.

The operations of the decryption program thus constructed will be described in the following.

The inputted cryptogram is decrypted in the decrypting procedure and is then arithmetically converted in the descrambling procedure by using the predetermined function.

If the cryptogram is altered, therefore, the result obtained is considerably different from that of descrambling to be intrinsically obtained, so that the restoration of the original physical characteristic information is completely impossible.

Figure 5:
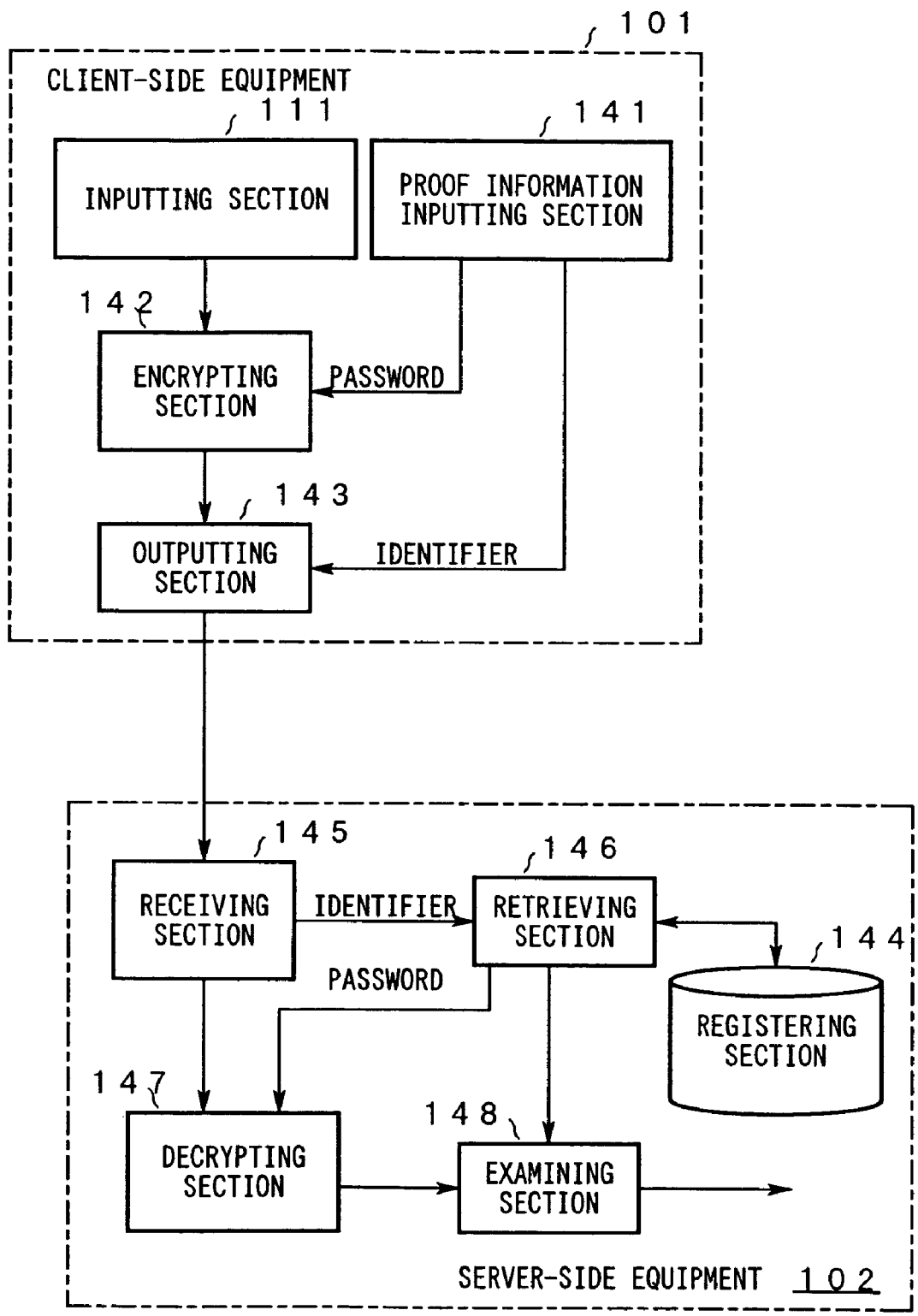
FIG. 5 is a block diagram illustrating the principle of an identification system according to one of the preferred embodiments of the invention.

FIG. 5 is a block diagram showing the principle of a remote identification system according to one of the preferred embodiments of the invention.

The remote identification system, as shown in FIG. 5, is constructed to comprise a client-side equipment 101 and a server-side equipment 102. The client-side equipment 101 or data sending equipment is constructed to include the inputting section 111, proof information inputting section 141, encrypting section 142 and outputting section 143. On the other hand, the server-side equipment 102 or identifying equipment is constructed to include registering section 144, receiving section 145, retrieving section 146, decrypting section 147 and examining section 148.

The principle of the remote identification system according to one of the preferred embodiments of the invention will be described in the following.

The inputting section 111 provided in the client-side identification equipment 101 or the data sending equipment inputs physical characteristic information representing a characteristic inherent to an individual. The proof information inputting section 141 provided in the client-side identification equipment 101 or the data sending equipment inputs information including identifier or identifying an individual and a password. The encrypting section 142 provided in the client-side identification equipment 101 or the data sending equipment encrypts the physical characteristic information by using the password as a cryptographic key and outputs a cryptogram. The outputting section 143 provided in the client-side identification equipment 101 or the data sending equipment outputs authenticating information generated from the cryptogram the identifier. The registering section 144 provided in the server-side identification equipment 102 or the identifying equipment registers password and reference data which is obtained by measuring a physical characteristics corresponding to each individual, relating to given identifier corresponding to each person. The receiving section 145 provided in the server-side identification equipment 102 or the identifying equipment receives an authenticating information consisting of the cryptogram and the identifier. The retrieving section 146 provided in the server-side identification equipment 102 or the identifying equipment retrieves a relating password and reference data from the registering section 144, according to the received identifier. The decrypting section 147 provided in the server-side identification equipment 102 or the identifying equipment decrypts the received cryptogram by using the password retrieved by the retrieving section 146 as a cryptographic key, and obtains physical characteristic information. The examining section 148 provided in the server-side identification equipment 102 or the identifying equipment examines whether or not the physical characteristic information and the retrieved reference data are equivalent.

The operations of the remote identification system thus constructed will be described in the following.

In the client-side identification equipment 101 or the data sending equipment, the physical characteristic information inputted by the inputting section 111 is encrypted by the encrypting section 142 by using the proof information inputted by the proof information inputting section as the cryptographic key and is outputted by the outputting section 143.

Here, the physical characteristic information is one fluctuating at each measurement so that the authenticating information to be outputted by the client-side equipment 101 or the data sending equipment is represented in different bit patterns at each identifying processing.

This authenticating information including encrypted physical characteristic information and identifier is received by the receiving section 145 provided in the server-side identification equipment 102 or the identifying equipment, and its encrypted physical characteristic information is decrypted by the decrypting section 147 and its identifier is subjected to the retrieving processing by the retrieving section 146.

The result of decryption obtained by the aforementioned decrypting section 147 and the reference data retrieved from the registering section 144 by the retrieving section 146 are compared by the examining section 148 to examine whether or not they are equivalent.

Therefore, a reliable identification can be realized by properly setting in the examining section 148 the criteria for examining whether or not the physical characteristic information obtained as a result of decryption and the reference data are equivalent, while considering the fluctuation of the physical characteristic information.

Moreover, the details of the individual section constructing the aforementioned cryptographic equipment and decrypting equipment will be described on their principles.

As shown in FIG. 2A, the numeric key determining section is constructed to include fluctuation extracting section 121 and converting section 122.

The principle of the numeric key determining section 112 according to one of the preferred embodiments of the invention will be described in the following.

The fluctuation extracting section 121 extracts a fluctuation element included in the physical characteristic information. The converting section 122 converts the fluctuation element received from the fluctuation extracting section 121, into a numeric value and outputs the result of conversion as a numeric key.

The operations of the numeric key determining section thus constructed will be described in the following.

By converting the fluctuation element extracted by the fluctuation extracting section 121 into a numeric value by the converting section 122, a random numeric key can be generated by utilizing the characteristics of the physical characteristic information as they are, thereby to make any random number generator unnecessary.

As shown in FIG. 2A, the code generating section 115 provided in the cryptographic equipment is constructed to include abstracting section 123 and synthesizing section 124.

The principle of the code generating section 115 according to one of the preferred embodiments of the invention will be described in the following.

In response to an input of the encrypted physical characteristic information, the abstracting section 123 generates a digest comprising elements individually reflecting the components comprising the encrypted physical characteristic information. The synthesizing section 124 synthesizes the digest and the numeric key by using a predetermined function, to subject the result of synthesis as an auxiliary code to the processing of the combining section 116.

The operations of the code generating section 115 thus constructed will be described in the following.

The digest reflecting each component of the encrypted physical characteristic information is obtained by the abstracting section 123 so that the auxiliary code uniformly reflecting each component comprising the encrypted physical characteristic information can be generated by synthesizing that digest and the numeric key by the synthesizing section 124.

On the other hand, the principle of the combining section 116 provided in the cryptographic equipment shown in FIG. 2A will be described in the following.

The combining section 116 combines the encrypted physical characteristic information and the auxiliary code in accordance with a predetermined rule, and outputs the combination as a cryptogram to the network.

The operations of the combining section 116 thus constructed will be described in the following.

The encrypted physical characteristic information and the auxiliary code are combined by the combining section 116 and are outputted in the combined state so that the illegal acts for analyzing the encrypted physical characteristic information and the auxiliary code individually can be made difficult to enhance the protectiveness against the cryptanalysis.

As shown in FIG. 2B, the numeric key restoring section 118 provided in the decrypting equipment is constructed to include the abstracting section 123 and separating section 125.

The principle of the numeric key restoring section 118 according to one of the preferred embodiments of the invention will be described in the following.

In response to an input of the encrypted physical characteristic information, the abstracting section 123 generates the digest comprising the elements individually reflecting the individual components comprising the encrypted physical characteristic information. The separating section 125 separates the elements derived from the digest from the auxiliary code, to restore the numeric key.

The operations of the numeric key restoring section 118 thus constructed will be described in the following.

In response to an input of the digest obtained by the abstracting section 123, the separating section 125 is enabled to restore the numeric key from the auxiliary code firmly combined with the encrypted physical characteristic information, by separating the elements derived from that digest from the auxiliary code, thereby to subject the restored numeric key to the processing of the key generating section 113.

On the other hand, the principle of the scrambling section 131 provided in the cryptographic equipment shown in FIG. 4A will be described in the following.

This scrambling section 131 arithmetically converts the elements derived from all the components comprising the information to be converted, by using a function reflecting them on the values of the individual components converted.

The operations of the scrambling section 131 having these features will be described in the following.

By executing the arithmetic conversion by the scrambling section 131, the area in which the individual blocks of the encrypted physical characteristic information have a depending relationship can be extended to all the blocks of the original physical characteristic information.

In other words, by subjecting the scrambled result obtained by that scrambling section 131 to the processing the encrypting section 132, therefore, it is possible to generate the encrypted physical characteristic information in which the individual blocks depend upon the entire physical characteristic information.

The principles of the encrypting section 142 provided in the client-side equipment 101 and the registering section 144 and the decrypting section 147 provided in the server-side equipment 102, as shown in FIG. 5A, will be described in the following.

The encrypting section 142 encrypts the physical characteristic information by using a password as a secret key. The registering section 144 registers a relating public key as the password of each person. The decrypting section 147 decrypts the encrypted physical characteristic information by using the public key received from the retrieving section 146.

The operations of the remote identification system provided with the aforementioned individual section will be described in the following.

In the client-side identification equipment 102, the physical characteristic information is encrypted by the encrypting section 142 by using the password as the secret key. In the server-side identification equipment 102, the encrypted physical characteristic information is decrypted by the decrypting section 147 by using the public key registered in the registering section 144. Thus, the safety of the remote identification system can be further improved.

By thus adopting the cryptographic method of the public key type, the authenticating information cannot be generated based on the information having leaked, even if the information registered in the server-side equipment leaks, so that such fraudulent access can be reliably blocked.

Embodiments of the invention will be described in detail with reference to the accompanying drawings.

Figure 6:
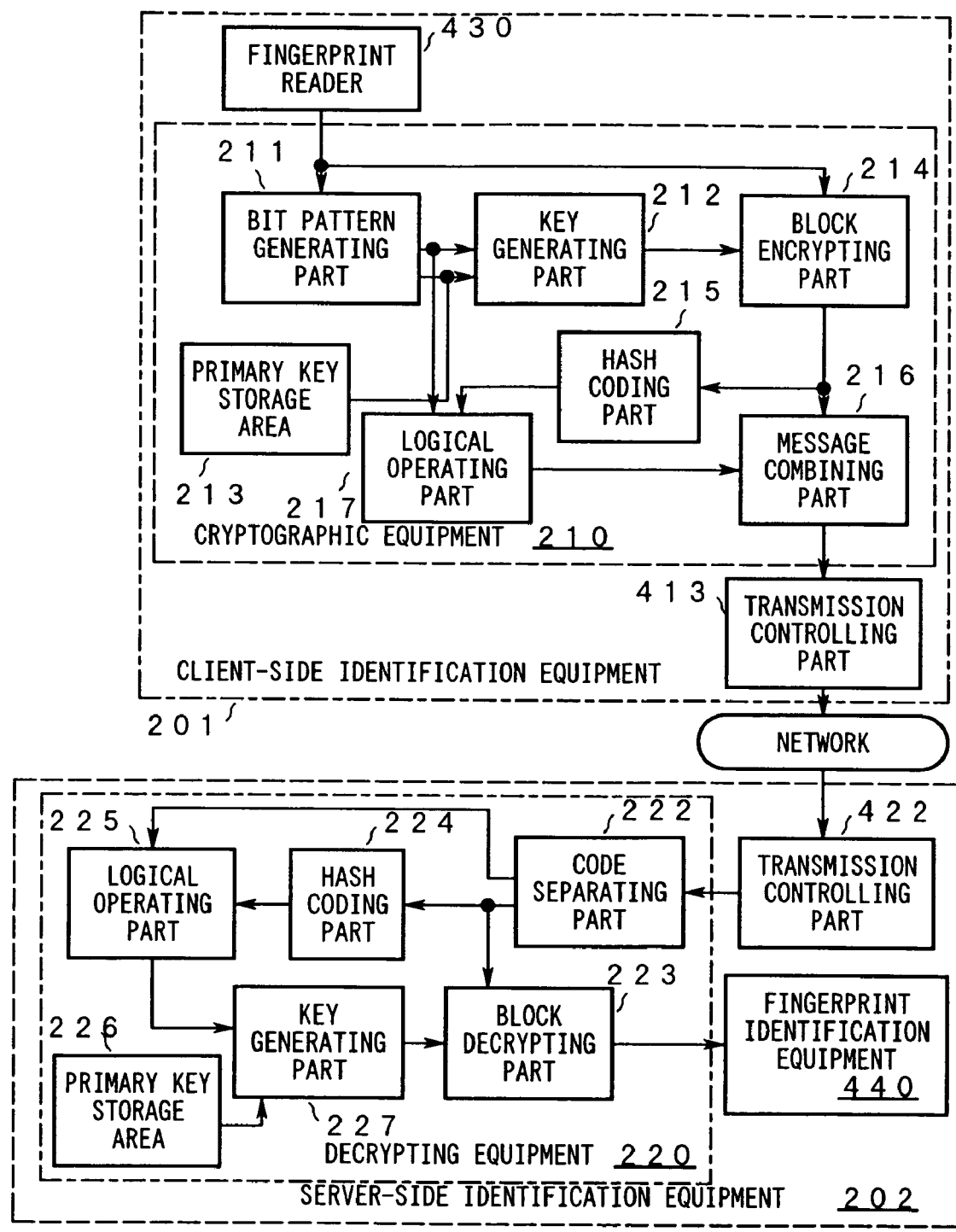
FIG. 6 is a diagram showing a first embodiment of the invention.
Figure 7:
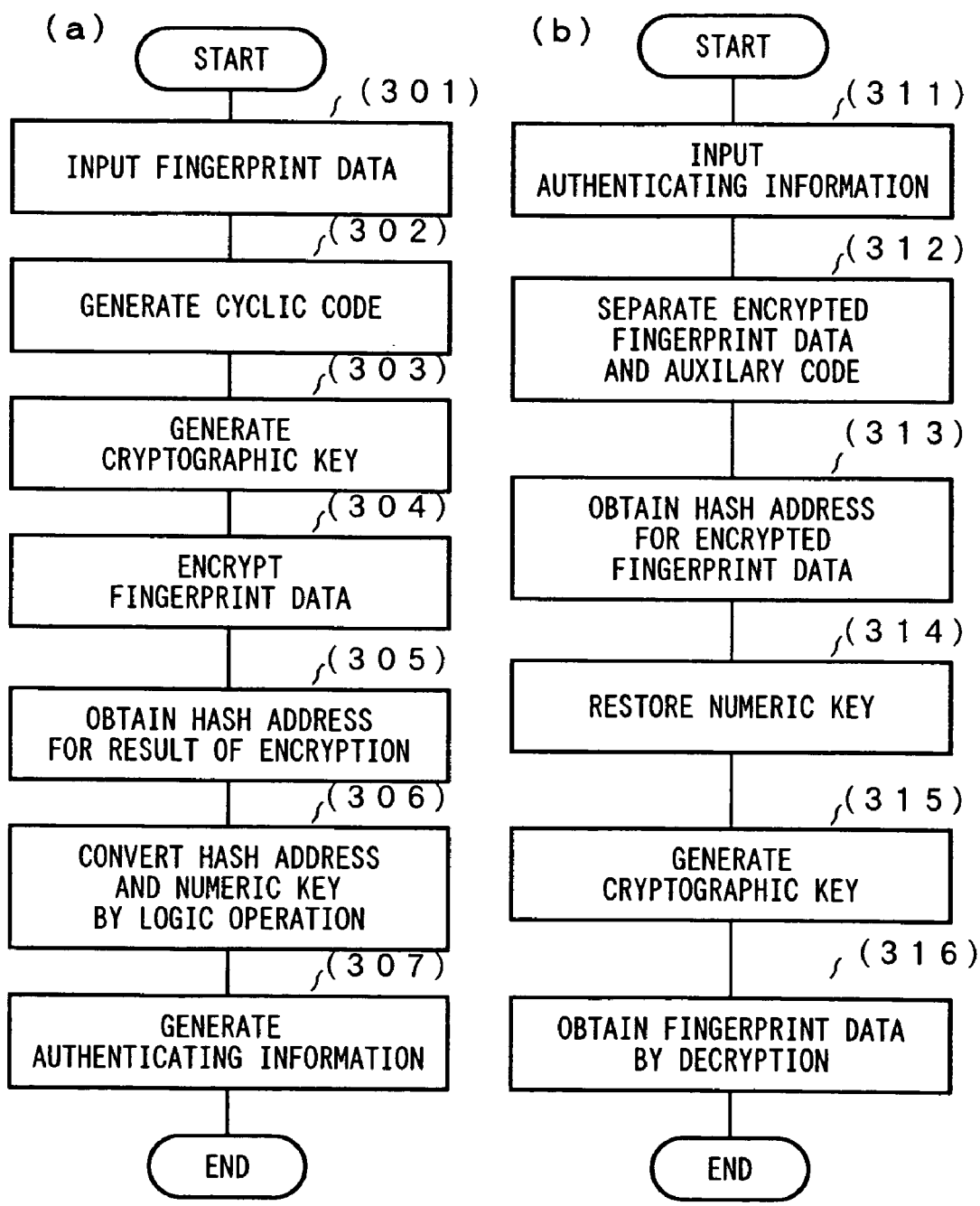
FIG. 7 is a flow chart showing the operations of the first embodiment of the invention.

FIG. 6 shows a first embodiment. On the other hand, FIG. 7 is a flow chart showing the encryption and the decryption.

Figure 16:
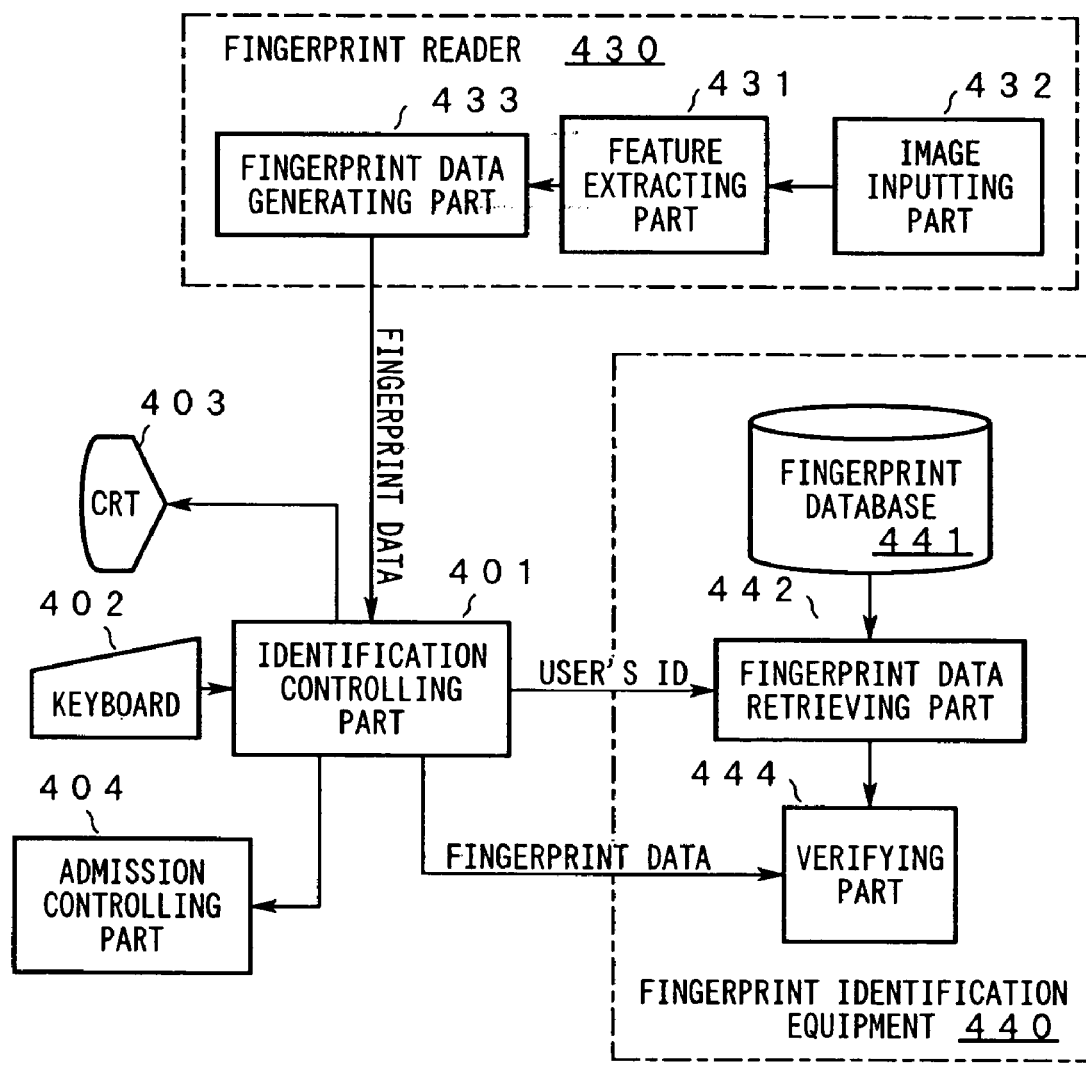
FIG. 16 is a diagram showing an example of the construction of the identification system of the prior art, utilizing the physical characteristic information.
Figure 18:
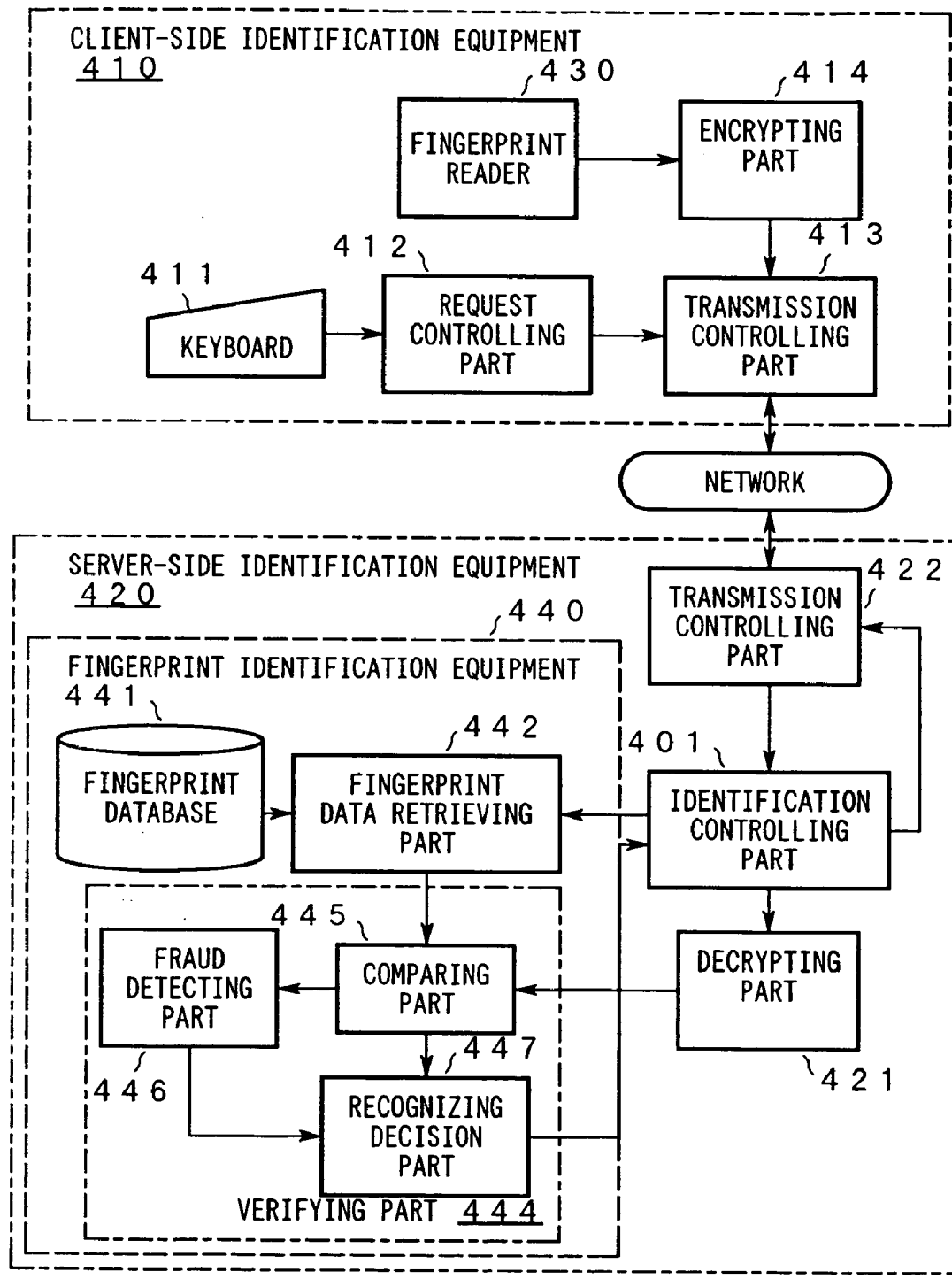
FIG. 18 is a diagram showing an example of the construction of the remote identification system utilizing the physical characteristic information.
Figure 19:
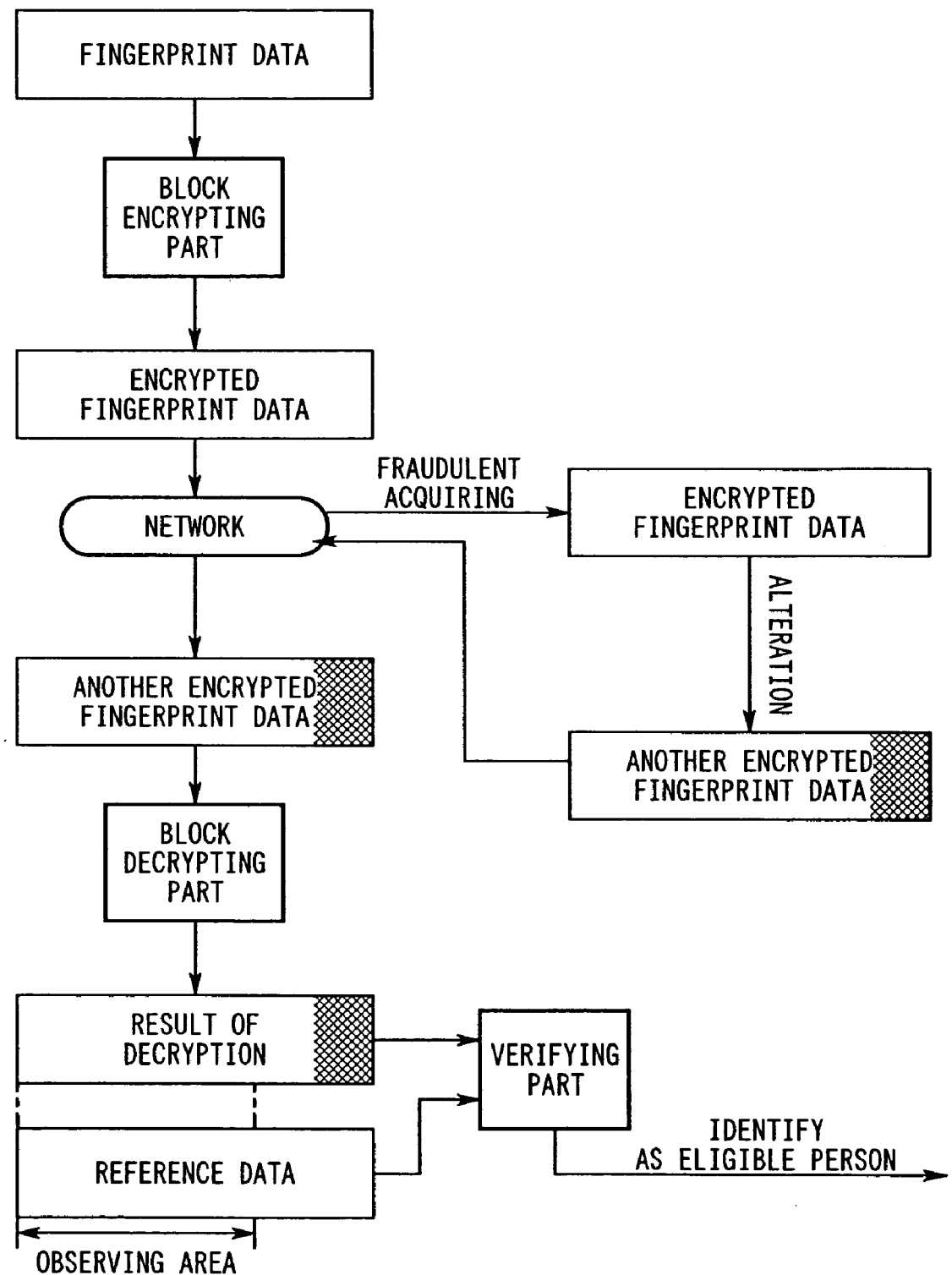
FIG. 19 is a diagram for explaining effects from alterations of the physical characteristic information.

Here in FIG. 6, the components having the same functions and constructions as those shown in FIGS. 16 and 18 are designated by the common reference numerals, and their description will be omitted.

In a client-side identification equipment 201 shown in FIG. 6, the fingerprint data obtained by the fingerprint reader 430 (see FIG. 16) are encrypted by a cryptographic equipment 210, and the encrypted physical characteristic information obtained is sent by the transmission controlling part 413 to the network.

In a server-side identification equipment 202, on the other hand, the encrypted physical characteristic information received by the transmission controlling part 422 is decrypted by a decrypting equipment 220 so that the result of this decryption is subjected to the processing of the fingerprint identification equipment 440.

In the cryptographic equipment 210 shown in FIG. 6, a bit pattern generating part 211 generates a cyclic code for cyclic redundancy check (CRC) of a predetermined length according to a series of numeric data representing the fingerprint data inputted (at Steps 301 and 302 in FIG. 7A), and the generated cyclic code is subjected as the numeric key to the processing of a key generating part 212.

Here, the fingerprint data obtained by the aforementioned fingerprint reader 430 contain not only information representing characteristics inherent to the person to be measured (hereunder referred to as "inherent characteristics") and also fluctuation elements fluctuating with the condition of measurement.

If a cyclic code of n-bits is generated by the aforementioned bit pattern generating part 211 according to a bit string representing the fluctuation elements, therefore, a bit pattern different for each input of fingerprint data never fails to be obtained but can be utilized as a numeric key changing at each encryption.

In other words, the bit pattern generating part 211 thus operates to transfer the bit pattern as numeric key obtained to the key generating part 212 so that random numeric data can be generated as a cryptographic key by utilizing the fluctuation of the fingerprint data.

In FIG. 6, on the other hand, a primary key storage area 213 stores a bit string of a length of n-bits as the primary key, and the key generating part 212 performs an exclusive OR operation between the primary key and the aforementioned bit pattern, for example, to generate a cryptographic key of n-bits (at Step 303 of FIG. 7A) and to subject the generated cryptographic key to the processing of a block encrypting part 214.

When a device password is registered in advance as information for identifying the client-side identification equipment 201, for example, the device password or its portion may be stored as the primary key in the primary key storage area 213. On the other hand, a user's password inputted by the person can be utilized as the primary key. Moreover, a bit pattern obtained by combining the device password and the user's password may be stored as the primary key in the primary key storage area 213.

In general, the longer the cryptographic key is, the more difficult the decryption of the encrypted information becomes, so that a bit pattern of 32 bits or longer should be generated as the cryptographic key.

In particular, a cyclic code of 56 bits is generated by the bit pattern generating part 211, and a bit pattern of the same length is stored as the primary key. If the cryptographic key of 56 bits is then generated by the key generating part 212, the block encryption such as the data encryption standard method can be applied.

In this case, the block encrypting part 214 may be constructed to encrypt the fingerprint data by using the aforementioned cryptographic key in accordance with the data encryption standard method (at Step 304 of FIG. 7A) and to subject the obtained encrypted fingerprint data to the processings of a hash coding part 215 and of a message combining part 216.

This hash coding part 215 is constructed to convert the encrypted fingerprint data, for example, into a hash address represented as a bit string shorter than their own length by using a proper hash function.

The hash address obtained by the hash coding part 215 is inputted together with the aforementioned numeric key to a logical operating part 217. This logical operating part 217 performs a predetermined logic operation to convert a combination of the hash address and the numeric key by a one-to-one mapping function and to transfer the result of operation to the message combining part 216.

Here, if a hash function having a sufficient diffusion is used in the aforementioned hash coding part 215, this hash coding part 215 can operate in response to an input of the encrypted data on the fingerprint characteristics to obtain a digest reflecting the summary of the encrypted fingerprint characteristic data (at Step 305 of FIG. 7A).

In response to the input of the hash address and the numeric key, on the other hand, the logical operating part 217 calculates their exclusive OR (at Step 306 of FIG. 7A) so that the two inputs can be converted into a mapping corresponding one-to-one to their combination thereby to obtain the result of logic operation reflecting both the hash address and the numeric key.

In this case, the aforementioned hash coding part 215 and logical operating part 217 can perform a simple arithmetic and logical operation to obtain an auxiliary code reflecting both a digest related closely to encrypted fingerprint characteristic data and the numeric key.

By thus generating a depending relationship between the auxiliary code and the encrypted fingerprint characteristic data, the cryptographic key to be utilized in the decrypting equipment changes depending upon both the auxiliary code and the encrypted fingerprint characteristic data, as will be described later, so that the restoration of the cryptographic key can be made impossible in response to the alteration of a cryptogram to be transmitted through the network.

On the other hand, the message combining part 216 shown in FIG. 6 combines the encrypted fingerprint characteristic data received from the block encrypting part 214 and the aforementioned auxiliary code (at Step 307 of FIG. 7A), for example, to generate the authenticating information represented as a series of bit string, as illustrated in FIG. 8, and to send the authenticating information to the network by the transmission controlling part 413.

Thus, in response to the inputs of the encrypted fingerprint characteristic data and the auxiliary code, the message combining part 216 can operate to combine the encrypted fingerprint characteristic data and the auxiliary code and to send them to the network by the transmission controlling part 413.

Next, a decrypting equipment of the first embodiment will be described in detail.

In the decrypting equipment 220 shown in FIG. 6, an auxiliary code separating part 222 receives the authenticating information shown in FIG. 8 from the transmission controlling part 422(at Step 311 of FIG. 7B), and separates the authenticating information into the encrypted fingerprint characteristic data (at Step 312 of FIG. 7B) and the auxiliary code to send the encrypted fingerprint characteristic data to a block decrypting part 223 and a hash coding part 224 and to send the auxiliary code to a logical operating part 225.

Here, the auxiliary code is the result of exclusive OR operation of the hash address corresponding to the encrypted fingerprint characteristic data and the numeric key, as has been described above.

Therefore, the hash address of the encrypted fingerprint characteristic data is determined by the hash coding part 224 by using the same hash function as that used in the encryption (at Step 313 of FIG. 7B), and the exclusive OR between the hash address and the auxiliary code is determined by the logical operating part 225(at Step 314 of FIG. 7B), so that the numeric key used for generating the cryptographic key can be restored.

In FIG. 6, on the other hand, a primary key storage area 226 stores the primary key used in the encryption, and the primary key storage area 226 and a key generating part 227 can operate, in response to the result of operation by the logical operating part 225 as the numeric key, to reproduce the cryptographic key used in the encryption and to subject the reproduced cryptographic key to the processing of the block decrypting part 223(at Steps 315 and 316 of FIG. 7B).

Thus, the decrypting equipment can be realized to restore the original fingerprint data from the authenticating information containing the encrypted fingerprint characteristic data obtained by the aforementioned cryptographic equipment 210.

Next, here will be described a method for blocking a fraudulent access by the server-side identification equipment 202 including the fingerprint identification equipment 440 of the aforementioned construction when the authenticating information is partially altered in the course of being transmitted in the network.

If the encrypted fingerprint characteristic data contained in the authenticating information is partially altered (as hatched in FIG. 8), as shown in FIGS. 8A and 8B, the hash address obtained by the hash coding part 224 is naturally different according to the input of the encrypted fingerprint characteristic data from that which is obtained by hash-coding the original encrypted fingerprint characteristic data.

In this case, an erroneous digest is obtained by the alteration of the encrypted fingerprint characteristic data so that the numeric key obtained by inputting the erroneous digest and the auxiliary code to the logical operating part is also erroneous. Naturally, the error is also propagated to the cryptographic key that is restored by the key generating part 227 according to that numeric key.

As a result, the block decrypting part 223 decrypts the altered encrypted fingerprint characteristic data by using the erroneous cryptographic key so that the result of decryption can be expected to be remarkably different from the original fingerprint data.

When the auxiliary code included in the authenticating information is altered, as shown in FIG. 8B, the correct hash address can be obtained by the hash coding part 224 in response to the input of the encrypted fingerprint characteristic data. However, since the auxiliary code is erroneous, the result of operation by the logical operating part will be erroneous, making the resulting numeric key different from the original numeric key.

In this case, too, the erroneous cryptographic key is subjected to the processing of the block decrypting part 223 as in the case where the encrypted fingerprint data are altered, so that the result of decryption obtained by the block decrypting part 223 can also be expected to be remarkably different from the original fingerprint data.

From this, altering the authenticating information even partially results in the breaking of the depending relationship formed in the encryption between the encrypted physical characteristic information and the auxiliary code, and the influence of this alteration can be propagated to the entire result of decryption.

Since the difference between the result of decryption obtained by using the erroneous cryptographic key and the original fingerprint data is serious as described above, it can be reliably decided by the fingerprint identification equipment 440 that the fingerprint data obtained in response to the input of the altered authenticating information do not belong to the eligible person.

This is because the influence of the alteration of an arbitrary portion of the authenticating information is exerted all over the result of decryption. It can therefore be expected that the information comprising to the observing area in the fingerprint identification equipment 440 is reliably influenced considerable amount.

Irrespective of the extent of the observing area, therefore, the fingerprint data restored from the altered authenticating information are reliably decided as not provided in the eligible person by the dactyloscopy. This makes it possible to reliably block the access according to the encrypted physical characteristic information fraudulently acquired.

Constructing to exclude the fingerprint data, which are identical to the reference data or the registered fingerprint data, when inputted, as the "replay attack" is adopted as in the fingerprint identification equipment 440 shown in FIG. 18, it is possible to block the access utilizing the fraudulently acquired authenticating information as it is.

In the first embodiment, the features of the inherent characteristics and the fluctuation elements included in the physical characteristic information are individually utilized to identify a person reliably to provide a remote identification system of high safety.

Here, the cryptographic method to be adopted in the encrypting part 214 may be one of the common key system, and an affine transformation cryptography or a vegenere cryptography may be adopted in place of the aforementioned data encryption standard method.

On the other hand, the unit length of encryption by the encrypting part 214 can also be modified.

In this modification, for example, the encryption unit has a length of 32 bits, and both the primary key and the numeric key are given 32 bits. The key generating part 212 generates a cryptographic key of 32 bits, and the encrypting part 214 determines random numbers sequentially for each block by utilizing that cryptographic key so that the series of result of exclusive OR operation between each random number and the corresponding block may be used as the result of encryption.

On the other hand, the digest of the encrypted physical characteristic information may depend upon the encrypted physical characteristic information as a whole. For example, therefore, the cryptographic equipment and the decrypting equipment may be constructed to include a decimating part for decimating bits simply from the bit string representing the encrypted physical characteristic information, to generate the digest, in place of the hash coding parts 215 and 224. Alternatively, the cryptographic equipment and the decrypting equipment can also be constructed to include a cyclic code generating part for generating the cyclic code on the encrypted physical characteristic information as the digest.

On the other hand, the client-side identification equipment 201 may be constructed to include an integrated circuit card writer in place of the transmission controlling part 413 shown in FIG. 6, and the server-side identification equipment 202 may be constructed to include an integrated circuit card reader in place of the transmission controlling part 422, so that the authenticating information may be sent and received by using the integrated circuit card.

In this case, the authenticating information can be transferred to the server-side identification equipment 202 by manually transporting the nameplate having the integrated circuit card (hereunder referred to as "IC card").

On the other hand, the program to be executed by the computer can realize the functions of the individual parts constructing the decrypting equipment 220 shown in FIG. 6. By recording the program in the storage media and distributing it, the system for encrypting the physical characteristic information safely by using the cryptographic method can be provided for users of wide range.

Likewise, the program for executing the computer can realize the functions of the individual parts constructing the decrypting equipment 220 shown in FIG. 6. By recording the program in the storage media and distributing it, there can be provided the system for decrypting only the proper authenticating information encrypted by using the first cryptographic method, correctly to restore the physical characteristic information and to subject it to the identifying processing.

Next, here will be described in detail of a cryptographic method and a decryption method, and a cryptographic equipment and a decrypting equipment of the second embodiment.

Figure 9:
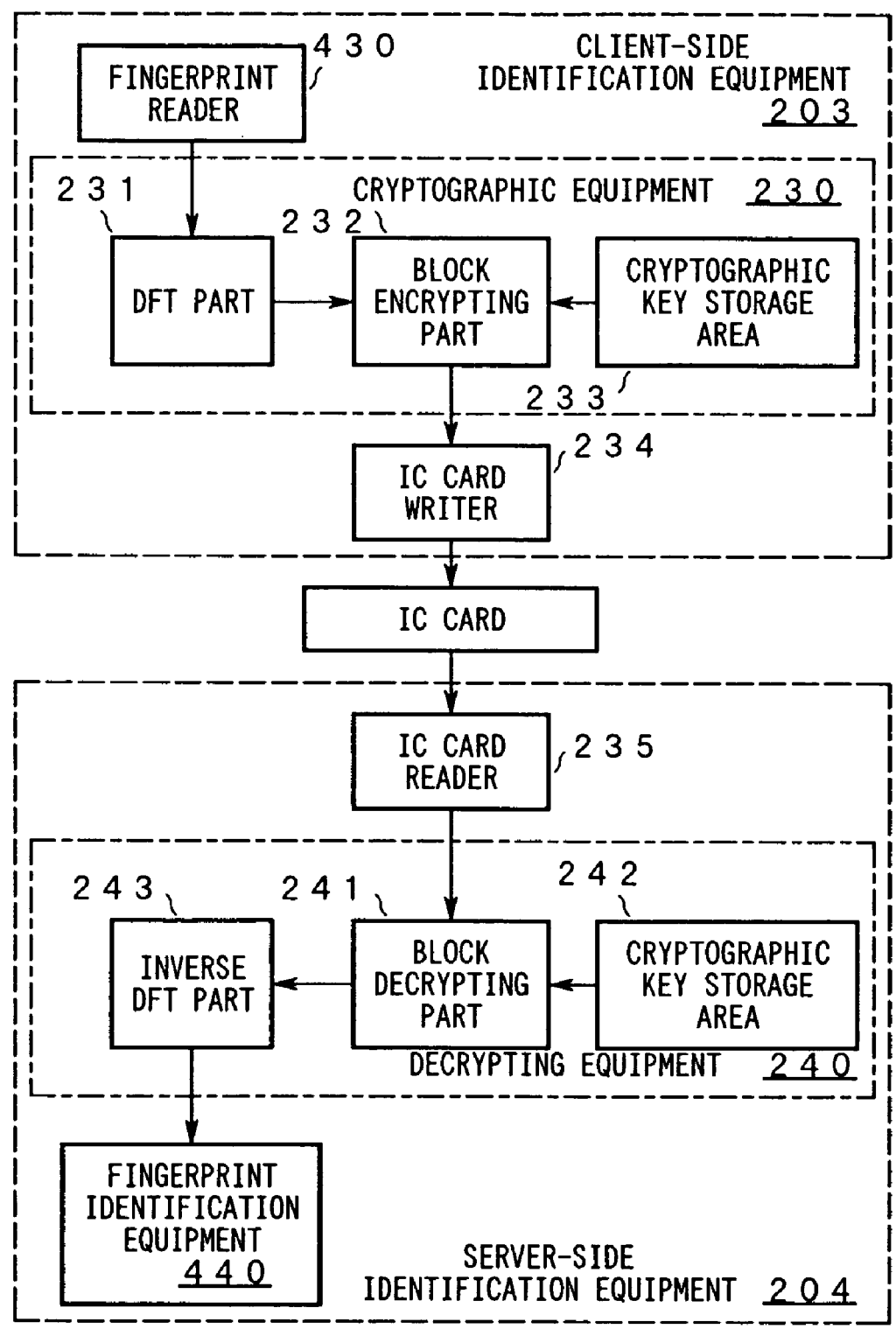
FIG. 9 is a diagram showing a second embodiment of the invention.

FIG. 9 shows a second embodiment of the invention.

In FIG. 9, a client-side identification equipment 203 and a server-side identification equipment 204 construct a remote identification system.

In this client-side identification equipment 203, the fingerprint data measured by the fingerprint reader 430 are encrypted by a cryptographic equipment 230, and the result of encryption obtained are written as authenticating information in an IC card by an IC card writer 234.

In the server-side identification equipment 204 shown in FIG. 9, on the other hand, authenticating information obtained by an IC card reader 235 having read the IC card. And this authenticating information is decrypted by decrypting equipment 240, and this result of decryption is subjected to the processing of the fingerprint identification equipment 440.

In the cryptographic equipment 230 shown in FIG. 9, a discrete Fourier transformation (DFT) part 231 discretely Fourier-transforms the fingerprint data received from the fingerprint reader 430, and subjects the result of transformation to the processing in a block encrypting part 232.

On the other hand, a cryptographic key storage area 233 shown in FIG. 9 stores a cryptographic key inherent to each registered client-side identification equipment respectively. And the block encrypting unit 232 encrypts the result of transformation by the discrete Fourier transformation part 231 for each block by using that cryptographic key. So the encrypted transformation result is subjected to a writing processing by the IC card writer 234.

Storing a cryptographic key of 56 bits in the cryptographic key storage area 233 and adopting the data encryption standard method in the block encrypting part 232, for example, it is possible to obtain the encrypted fingerprint data which are extremely hard to decrypt.

Figure 10:
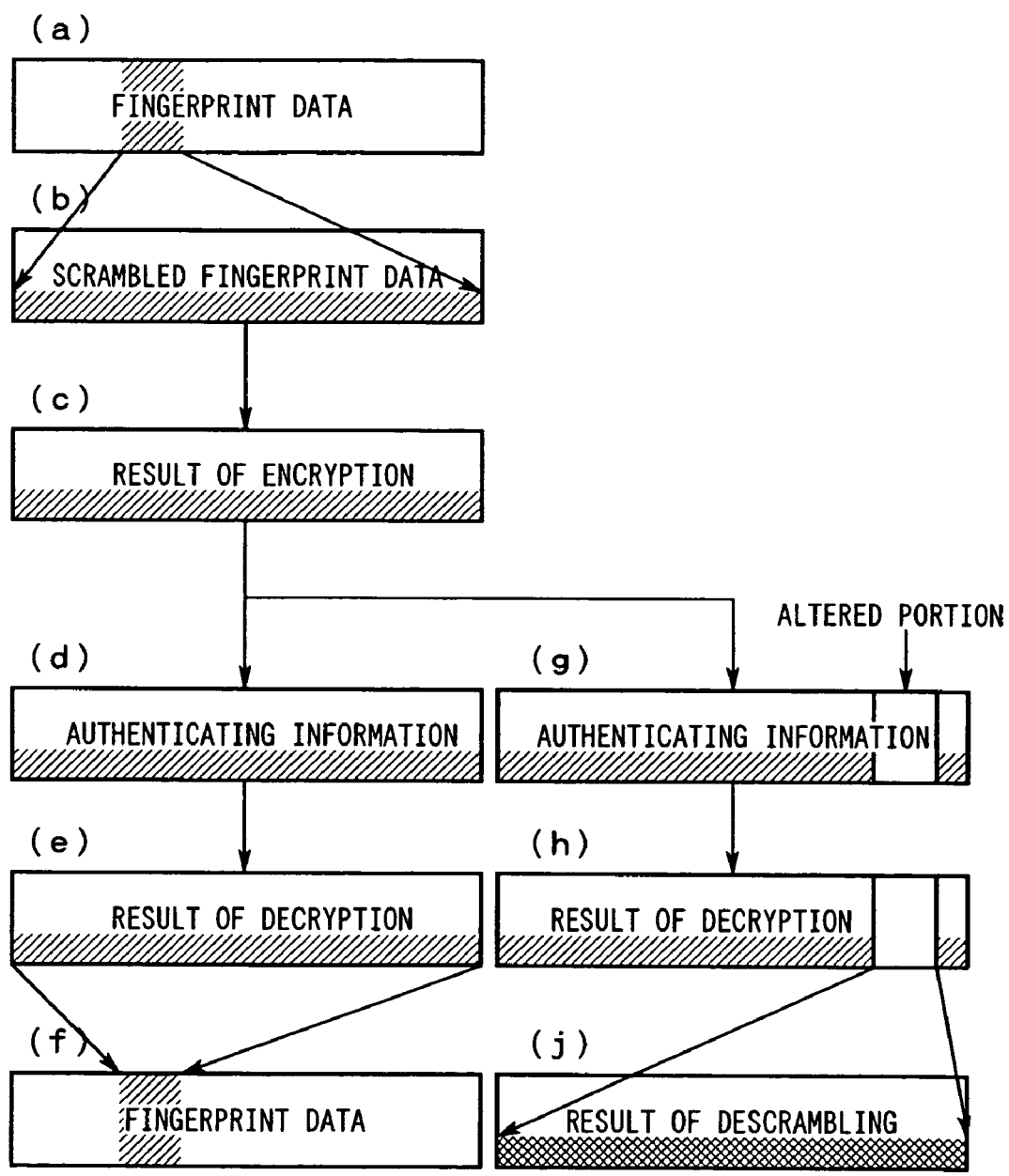
FIG. 10 is a diagram for explaining an effect of scrambling.

Here, the discrete Fourier transformation part 231 Fourier-transforms the fingerprint data so that the influences caused by the individual components constructing the fingerprint data are exerted upon the entirety of the result of Fourier transformation, as illustrated in FIGS. 10A and 10B. Therefore, the individual blocks or the encryption units by the block encrypting part 232 are dependent upon all the components constructing the fingerprint data (see FIG. 10C).

Therefore, when the fingerprint data are encrypted after Fourier-transformed, as described above, the information of the individual blocks constructs the result of encryption is dependent upon all the components constructing the fingerprint data.

In other words, the individual parts of the cryptographic equipment shown in FIG. 9 operate, as described above, the physical characteristic information can be encrypted by the cryptographic method to generate the cryptogram composed of components depending upon all the components of the physical characteristic information.

In the decrypting equipment 240 shown in FIG. 9, on the other hand, the authenticated information read by the IC card reader 235 are transferred to a block decrypting part 241. In response to this, the block decrypting part 241 sequentially decrypts the individual components of the authenticating information, by using the cryptographic key stored in a cryptographic key storage area 242. And the result of decryption is subjected to the processing of an inverse Fourier transformation (or inverse DFT) part 243.

When the data encryption standard method is adopted in the encryption, as described above, the cryptographic key used in the encryption may be stored in the cryptographic key storage area 242 so that the block decrypting part 241 may decrypt the individual blocks of the authenticating information in accordance with the data encryption standard method.

When the authenticating information by the aforementioned cryptographic equipment 230 arrive as they are at the decrypting equipment 240, as illustrated in FIG. 10D, the result of decryption by the block decrypting part 241 is identical to the result of transformation by the discrete Fourier transformation part 231 during the cryptographic processing (see FIG. 10E).

In response to an input of the result of decryption by the block decrypting part 241, therefore, the inverse Fourier transformation part 243 can perform the inverse Fourier transformation to put the elements derived from the individual components comprising the original fingerprint data, as scattered into the individual components constructing the scrambled result together, thereby to restore the original fingerprint data (see FIG. 10F).

When the authenticating information obtained by the cryptographic method described above is thus inputted as it is to the decrypting equipment 240 shown in FIG. 9, the individual parts constructing the decrypting equipment 240 can perform the aforementioned operations to restore the original physical characteristic information completely by using the decryption method described above. So the restored physical characteristic information can be subjected to the identifying processing of the fingerprint identification equipment 440 or the like.

If the partially altered authenticating information are inputted as illustrated in FIG. 10G, on the other hand, the elements derived from the altered component of cryptogram diffuse all over the descrambled result (see FIGS. 10H and 10J) when the result of decryption by the block decrypting part 241 is to be inversely Fourier-transformed by the inverse Fourier transformation part 243. Therefore the result of conversion to be obtained is considerably different from the original fingerprint data.

Thus, in response to the alteration of the cryptogram as the authenticating information, the depending relationship between the corresponding component of cryptogram and the entire original fingerprint data is automatically broken. In order to restore the original fingerprint data in the decryption, therefore, it is necessary that all the blocks constructing the cryptogram not be altered. It is possible to block the attack to alter and utilize the authenticating information which was fraudulently acquired on the network.

On the other hand, the program can realize the functions of the individual parts constructing the cryptographic equipment 230 shown in FIG. 9. By recording the program in the storage media and distributing it, the system for encrypting the physical characteristic information safely by using the cryptographic method can be provided for users of wide range.

Likewise, the program can realize the functions of the individual parts constructing the decryption equipment 240 shown in FIG. 9. By recording the program in the storage media and distributing it, there can be provided the system for decrypting only the proper authenticating information correctly by using the decryption method to restore the physical characteristic information and to subject it to the identifying processing.

When the cryptographic method and the decryption method described above are applied, moreover, it is possible to enjoy the effect to block an attack to analyze the identifying processing of the physical characteristic information and the effect to block an attack to analyze the data structure of the physical characteristic information itself.

First of all, the former effect will be described with reference to FIG. 11.

When no scrambling processing is performed in the encryption, the influence by the alteration of the encrypted data is exerted upon only a portion of the result of decryption so long as the block encrypting method is adopted, no matter how excellent the cryptographic method might be.

When the individual blocks of the authenticating information are sequentially altered, therefore, the area for the result of decryption to be compared with the reference data, that is, the observing area can be discriminated, as illustrated in FIG. 11A, by observing whether or not the access by that authenticating information is received.

When the scrambling and the block encryption are combined, on the other hand, the influence of alteration is propagated to the entire descrambled result by the descrambling processing conducted subsequent to the decryption even if the authenticating information is altered slightly. As a result, a variance exceeding the allowable error occurs also in the observing area, so that the result of comparison with the reference data never fails to mismatch.

Therefore, the aforementioned method cannot analyze the recognizing processing of the physical characteristic information.

Figure 12:
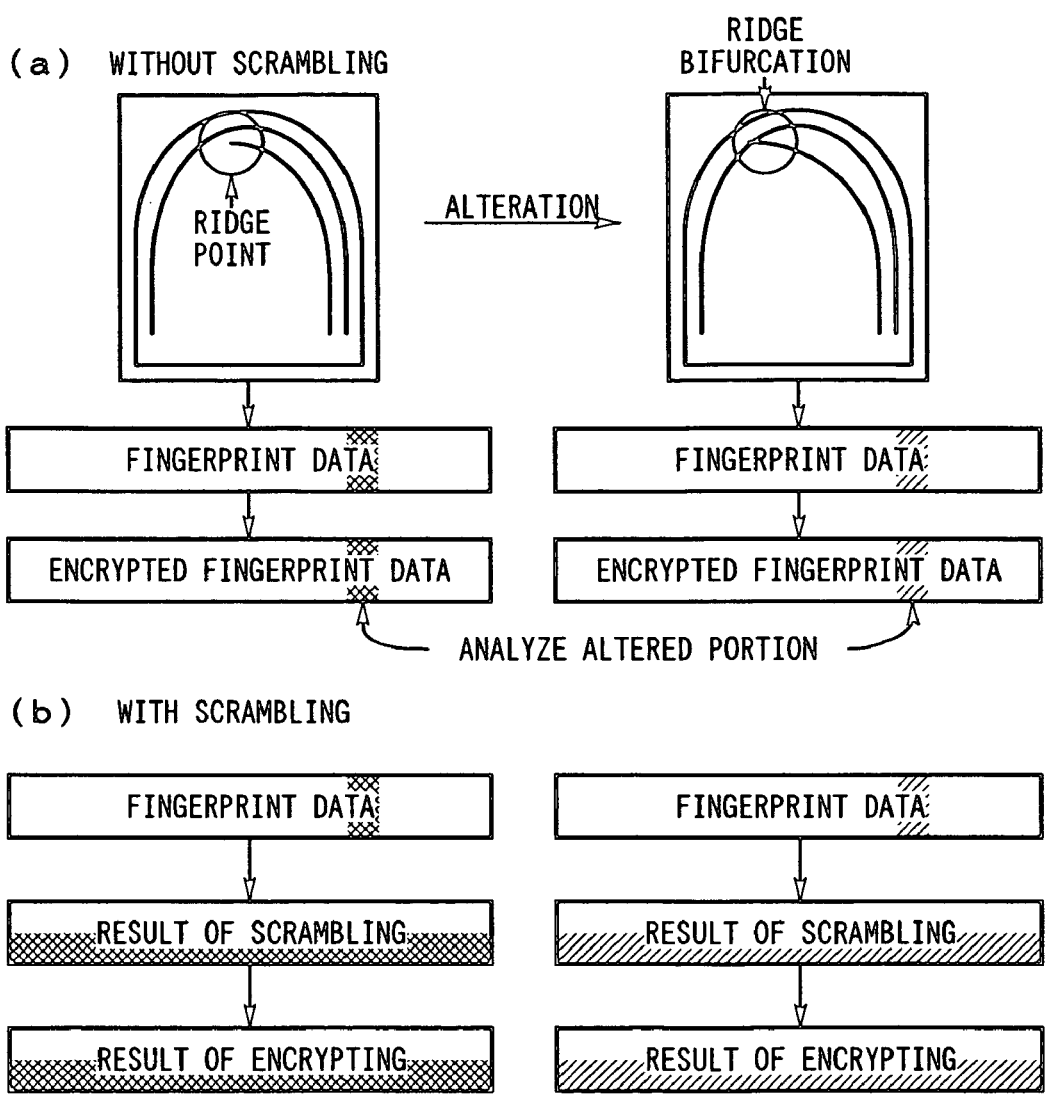
FIG. 12 is a diagram for explaining effect of preventing structural analysis in terms of physical characteristic information.

With reference to FIG. 12, here will be described the effect to prevent the data structure analysis of the physical characteristic information itself.

In the case of no scrambling processing in the encryption, the change in the content of each of the component constructing the physical characteristic information is reflected directly on the content of the corresponding block included in the encrypted data.

When a circled portion in the image data of a fingerprint is altered from a ridge point to a ridge bifurcation, as illustrated in FIG. 12A, a change to appear in the encrypted data is accordingly observed. Then, it is possible to grasp at what portion of the fingerprint data the feature of the aforementioned portion is described.

When the scrambling and the block encryption are combined, on the other hand, the contribution of the portion describing the individual features in the fingerprint data, as illustrated in FIG. 12A, is scattered over all the blocks constructing the encrypted data by the effect of the scrambling, as illustrated by different kinds of hatching in FIG. 12B.

As a result, the aforementioned method cannot analyze the data structure of the physical characteristic information.

By thus combining the scrambling and the encryption, it is possible to block the fraudulent access that was tried by simply altering the encrypted physical characteristic information and to make remarkably difficult an attack to forge the physical characteristic information itself.

As a result, it is possible to considerably improve the safety of the identification system.

On the other hand, the client-side identification equipment 203 may be constructed to include a transmission controlling part in place of the IC card writer 234 shown in FIG. 9, and the server-side identification equipment 204 may be constructed to include a transmission controlling part in place of the IC card reader 235, so that the authenticating information may be sent and received through the network.

Here, the physical characteristic information such as the fingerprint data contains the fluctuation elements varying with the conditions of measurement so that the improvement in the recognition rate is limited. If the observing area is narrowed, as has been described with reference to FIG. 17, for example, another fingerprint data may be misidentified as that of the eligible person's.

On the other hand, the method for identifying the person with the password can ensure the identification by combining the password and the user's ID, but the safety of the entire remote identification system depends upon whether or not the individual can manage the password strictly, so that the burden on the individual is increased.

Next, here will be described a method for improving the safety of the remote identification system by combining the features of the physical characteristic information and the features of the password.

Figure 13:
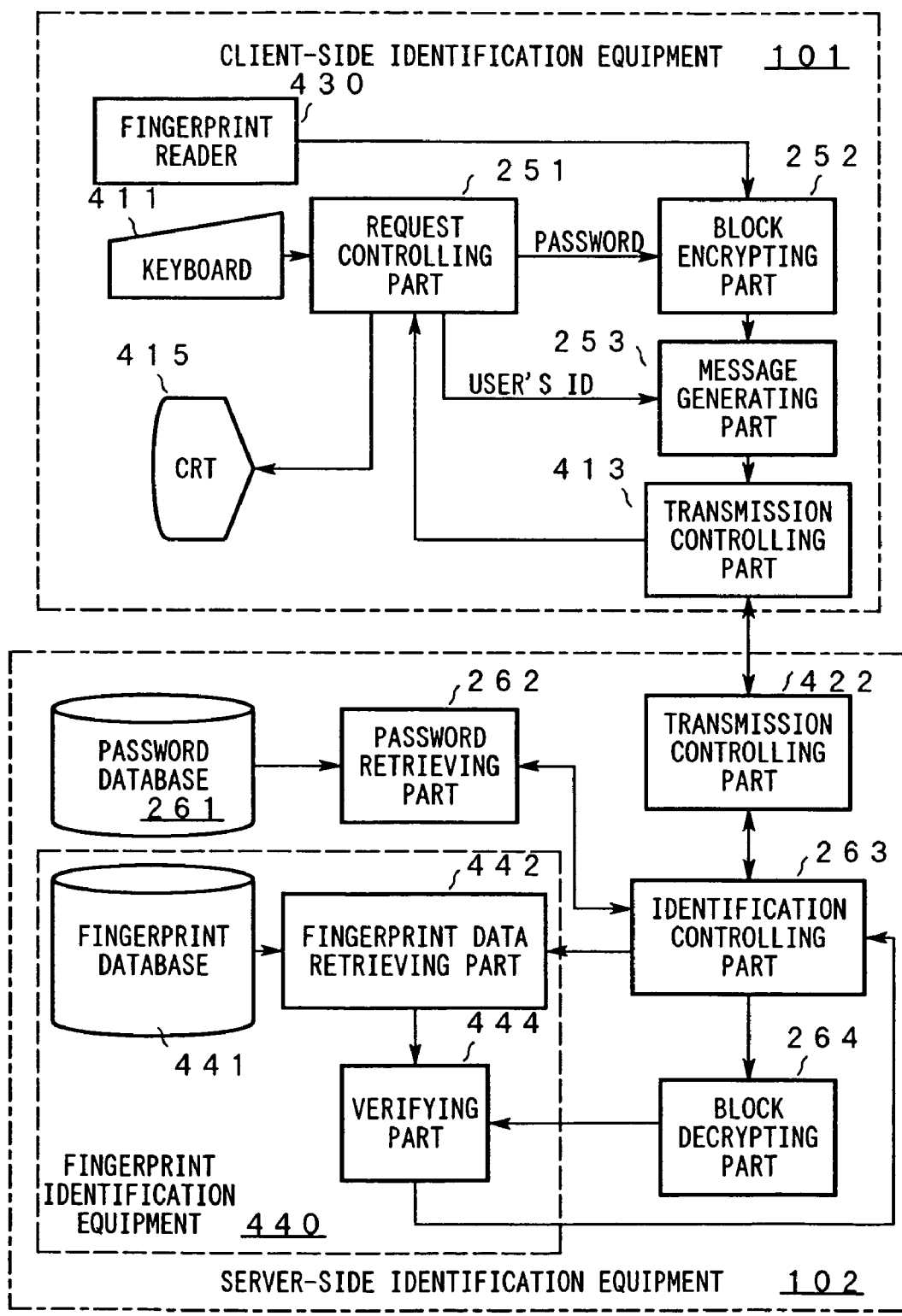
FIG. 13 is a diagram showing a third embodiment of the invention.
Figure 15:
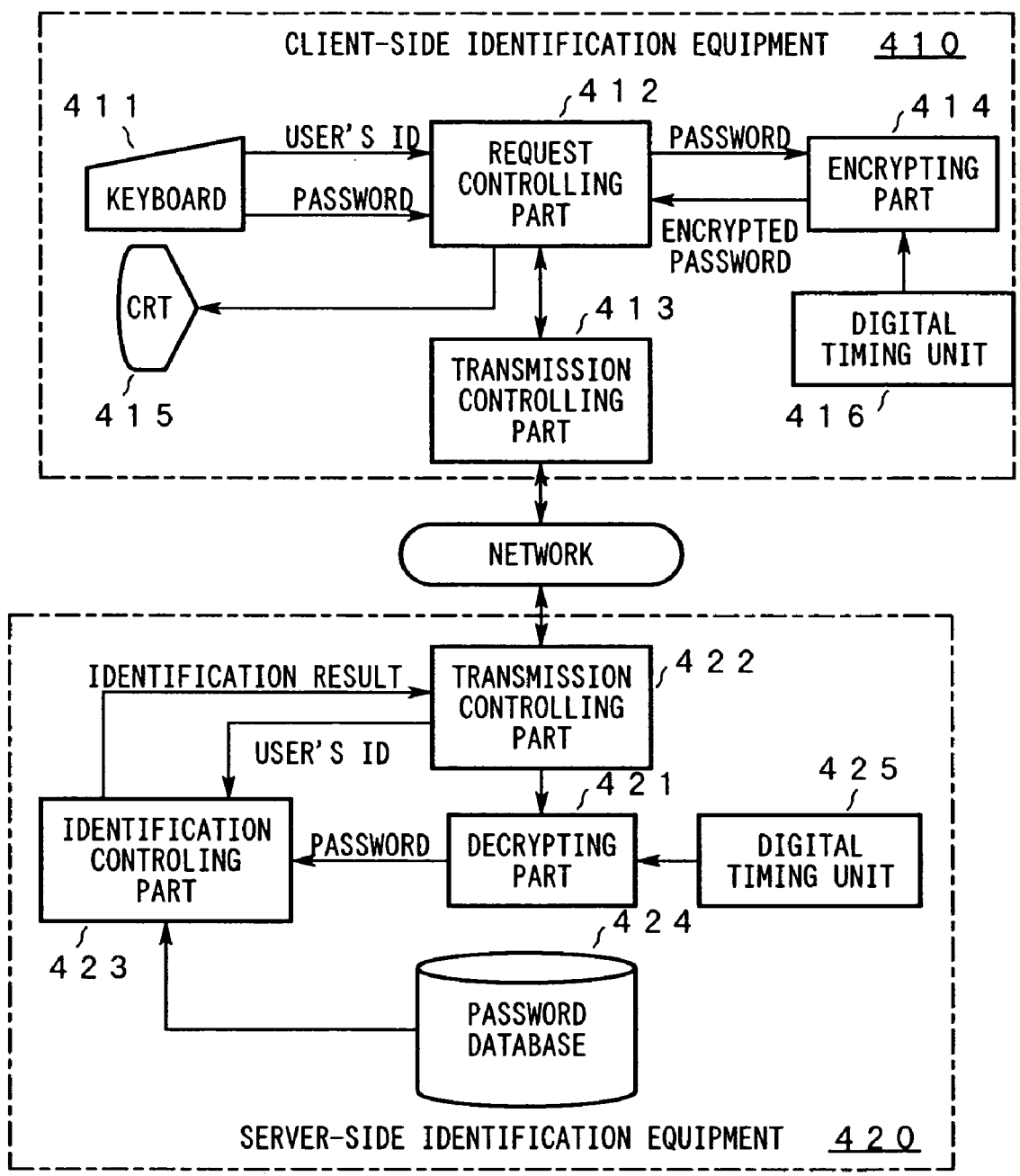
FIG. 15 is a diagram showing an example of the construction of a remote identification system of the prior art.

FIG. 13 shows a third embodiment of the invention.

In the client-side identification equipment 101 shown in FIG. 13, the user's ID and password inputted by the keyboard 411 are individually transferred by a request controlling part 251 to a block encrypting part 252 and an message generating part 253.

This block encrypting part 252 receives the aforementioned password from the request controlling part 251 and encrypts the fingerprint data received from the fingerprint reader 430, by using the password as the key in accordance with the cryptographic method of the common key system such as the data encryption standard method, to subject the result of encryption to the processing of the message generating part 253.

On the other hand, the message generating part 253 shown in FIG. 13 generates the authenticating information by combining the encrypted fingerprint data received from the block encrypting part 252 and the user's ID received from the request controlling part 251, and sends the generated authenticating information to the network by the transmission controlling part 413.

Thus, in response to the inputs of the encrypted fingerprint data and the user's ID, the message generating part 253 and the transmission controlling part 413 can operate to output the authenticating information including the encrypted fingerprint data and the user's ID and to transfer the authenticating information to the server-side identification equipment 102 through the network.

As described above, the fingerprint data represent the feature inherent to an individual, but the data numerating the feature fluctuate at each measurement due to the measurement error. By encrypting the fingerprint data by using the password as the cryptographic key, therefore, the authenticating information to be sent to the server-side identification equipment 102 is represented by a bit pattern different at each identification request.

As in the case where the password is encrypted into the authenticating information by using the onetime cryptographic key, therefore, the authenticating information to be transmitted through the network can be made extremely difficult to decrypt by a fraudulent method.

In the server-side identification equipment 102 shown in FIG. 13, on the other hand, a password database 261 stores a password relating to each user's ID.

In FIG. 13, on the other hand, a password retrieving part 262 responds to an instruction from an identification controlling part 263 to retrieve the related password from the password database 261 and to subject the retrieved password to the processing of the identification controlling part 263.

This identification controlling part 263 receives the aforementioned authenticating information from the transmission controlling part 422 and retrieves the password relating to the user's ID included in the authenticating information by designating the user's ID to utilize the function of the password retrieving part 262, to subject the password obtained and the encrypted fingerprint data to the processing of a block decrypting part 264, and to inform the fingerprint identification equipment 440 of the user's ID.

Since the fingerprint data were encrypted by using the password inputted by the person oneself, as described above, the block decrypting part 264 may perform the decryption by using the password retrieved by the password retrieving part 262 as the cryptographic key, to subject the restored fingerprint data to the processing of the fingerprint identification equipment 440.

In FIG. 13, the fingerprint database 441 provided in the fingerprint identification equipment 440 stores the user's ID and the reference data that are obtained by measuring the fingerprint of the related person under a reference condition.

On the other hand, the fingerprint data retrieving part 442 provided in the fingerprint identification equipment 440 retrieves the reference data according to the user's ID from the fingerprint database 441.

The reference data thus obtained are subjected to the identifying processing of the verifying part 444.

This verifying part 444 compares the fingerprint data received from the block decrypting part 264 and the aforementioned reference data and returns the result of recognition derived from the result of comparison to the identification controlling part 263.

Thus, it is possible to construct the remote identification system that utilizes the physical characteristic information and the password.

In this remote identification system, only when the permitted person subjects his or her own fingerprint to the measurement of the fingerprint reader 430 and inputs a proper password, the fingerprint data obtained by the fingerprint reader 430 are completely restored by the aforementioned block decrypting part 264 and are subjected to the processing of the verifying part 444.

At this time, each of the components of the restored fingerprint data matches with each of the components of the reference data within a permitted range over an area covering the observing area according to a predetermined recognition rate so that the result of comparison indicating the match with the reference data is obtained by the fingerprint identification equipment 440.

In this case, the identification controlling part 263 utilizes the function of the transmission controlling part 422 to inform the client-side identification equipment 101 of the identification result of having confirmed the identify. On the other hand, the request controlling unit 251 provided in the client-side identification equipment 101 receives the identification result through the transmission controlling part 413 and may inform the person of the fact that the access is admitted by the CRT displaying equipment (CRT) 415, for example.

Next, here will be described the operation of the remote identification system, as shown in FIG. 13, to block the fraudulent access with reference to FIG. 14.

When a fraudulent person makes an access by using the password that was plagiarized from an eligible person, for example, the block encrypting part encrypts the fingerprint data of the aforementioned fraudulent person by using the plagiarized password as the cryptographic key, and transfers the encrypted data to the server-side identification equipment.

In response to this, the decrypting part provided in the server-side identification equipment shown in FIG. 14A performs the decryption according to the password received from the password retrieving part so that the fingerprint data of the fraudulent person are obtained and subjected together with the reference data of the eligible person retrieved from the fingerprint database, to the identifying processing by the verifying part.

In this case, another fingerprint data are compared with each other so that the apparently mismatching result of comparison is naturally obtained by the verifying part. According to the result of recognition derived from the result of comparison, the identification controlling part 263 shown in FIG. 13 may deny the permission of the fraudulent person and may exclude it as the fraudulent access.

On the other hand, the plagiarism, if any, of the fingerprint data of the eligible person can be likewise coped with.

In this case, as shown in FIG. 14B, the block encrypting part encrypts the plagiarized fingerprint data by using the erroneous password as the cryptographic key. By the decrypting part in the server-side identification equipment, therefore, the plagiarized fingerprint data are decrypted by using the proper password as the cryptographic key so that a meaningless bit string is generated in place of the fingerprint data.

Therefore, the verifying part compares the bit string and the reference data to give a result that they mismatch. In response to an input of the result of recognition derived from the result of comparison, the identification controlling part 263 shown in FIG. 13 may deny the permission of the fraudulent person and may exclude it as the fraudulent access.

Thus in the remote identification system shown in FIG. 13, both the physical characteristic information representing a characteristic inherent to an individual and the password to be concealed and managed from others by the person can be used to confirm the identity, and the fluctuation of the physical characteristic information can be utilized to make the cryptanalysis of the authenticating information difficult.

Here, the physical characteristic information fluctuates within a range of measurement errors at every measurement so that its cryptanalysis is difficult when encrypted, and this point is excellent as the authenticating information. On the contrary, the physical characteristic information is invariable for the life of a person. Once a certain person prepares a circumstance, in which the pseudo physical characteristic information having a fluctuation corresponding to the measurement error can be freely generated, according to the fundamental physical characteristic information, the related physical characteristic information cannot be used as the authenticating information, to cause a fatal defect.

On the other hand, the password can be suitably changed, if necessary, and is excellent in usability as the authenticating information. As has been described in DESCRIPTION OF THE RELATED ART, on the contrary, the password is easily plagiarized and is composed of a fixed string so that it is defective in the point that decryption is easy even if encrypted.

As described above, the physical characteristic information and the password have respective advantages and disadvantages, if viewed independently. According to the identification system shown in FIG. 13, however, the respective advantages and disadvantages of the physical characteristic information and the password can be compensated each other by integrating the physical characteristic information and the password and by making their separation difficult, thereby to ensure identification of the eligibility of a person.

This can lighten the burden on the person concerning the management of the password and can improve the safety of the remote identification system so that important information can be safely sent and received through the network. As a result, it is possible to function the e-commerce and the system for sending and receiving the information requiring secrecy safely.

On the other hand, the physical characteristic information may be encrypted by the public key system.

In this case, in the client-side identification equipment 101 shown in FIG. 13, the block encrypting part 252 may encrypt the physical characteristic information such as the fingerprint data by using the password received from the request controlling part 251 as the secret key, for example, by using an RSA algorithm.

On the other hand, the block decrypting part 264 provided in the server-side identification equipment 102 shown in FIG. 13 may decrypt the encrypted fingerprint data received from the identification controlling part 263, by using the public key to subject the restored physical characteristic information to the identifying processing.

In this case, the cryptographic key used for generating the authenticating information and the cryptographic key to be used for the decryption are different. Even if the content of the password database 261 is plagiarized by hacking the server-side identification equipment 102, for example, the safety of the entire remote identification system can be assured.

On the other hand, the client-side identification equipment may be constructed to include the IC card writer in place of the transmission controlling part 413 shown in FIG. 13, and the server-side identification equipment may be constructed to include the IC card reader in place of the transmission controlling part 422, so that the authenticating information may be sent and received by manually transporting the IC card.

The invention is not limited to the above embodiments and various modifications may be made without departing from the spirit scope of the invention. Any improvement may be made in part or all of the components.

What is claimed is:

1. A cryptographic method comprising:
receiving physical characteristic information representing a characteristic inherent to an individual;
randomly determining a numeric key;
generating a cryptographic key from said numeric key and a predetermined primary key;
encrypting said physical characteristic information using said cryptographic key; and
generating an auxiliary code for decrypting said cryptographic key, from said encrypted physical characteristic information and said numeric key.

2. A decryption method comprising:
receiving encrypted physical characteristic information and an auxiliary code;
restoring a numeric key from said received encrypted physical characteristic information and said auxiliary code;
restoring cryptographic key from said numeric key and a predetermined primary key; and
decrypting said encrypted physical characteristic information by using said cryptographic key and obtaining physical characteristic information.

3. A cryptographic equipment, comprising:
an inputting unit inputting physical characteristic information representing a characteristic inherent to an individual;
a numeric key generating unit randomly determining numeric key;

a key generating unit generating a cryptographic key from said numeric key and a predetermined primary key;

an encrypting unit encrypting said physical characteristic information using said cryptographic key; and a code generating unit generating an auxiliary code from said encrypted physical characteristic information and said numeric key.

4. A decryption equipment comprising:

a receiving unit receiving an encrypted physical characteristic information and an auxiliary code;

a numeric key restoring unit restoring a numeric key from said encrypted physical characteristic information and said auxiliary code;

a key generating unit generating a cryptographic key from said numeric key and a predetermined primary key; and a decrypting unit decrypting said encrypted physical characteristic information by using said cryptographic key.

5. A storage media storing a program to read and be executed by a computer, comprising:

an inputting procedure inputting physical characteristic information representing a characteristic inherent to an individual;

a numeric key generating procedure randomly determining a numeric key;

a key generating procedure generating a cryptographic key from said numeric key and a predetermined primary key;

an encrypting procedure encrypting said physical characteristic information using said cryptographic key; and a code generating procedure generating an auxiliary code from said encrypted physical characteristic information and said numeric key.

6. A storage media storing a program to read and be executed by a computer, comprising:

a receiving procedure receiving a cryptogram including an encrypted physical characteristic information and an auxiliary code;

a numeric key restoring procedure restoring a numeric key from said encrypted physical characteristic information and said auxiliary code;

a key generating procedure generating a cryptographic key from said numeric key and a predetermined primary key; and a decrypting procedure decrypting said encrypted physical characteristic information by using said cryptographic key.

* * * * *